US006930797B2

(12) United States Patent
Ramanujan et al.

(10) Patent No.: US 6,930,797 B2
(45) Date of Patent: Aug. 16, 2005

(54) METHOD AND APPARATUS FOR PRINTING HIGH RESOLUTION IMAGES USING MULTIPLE REFLECTIVE SPATIAL LIGHT MODULATORS

(75) Inventors: Sujatha Ramanujan, Pittsford, NY (US); David Kessler, Rochester, NY (US); James E. Roddy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 961 days.

(21) Appl. No.: 09/794,669

(22) Filed: Feb. 27, 2001

(65) Prior Publication Data

US 2002/0118375 A1 Aug. 29, 2002

(51) Int. Cl.[7] .................................................. G06K 1/00

(52) U.S. Cl. ........................ 358/1.2; 358/296; 347/239; 347/241; 347/255; 347/256

(58) Field of Search ......................... 358/1.1, 1.2, 3.32, 358/505, 511, 512, 296, 300, 302; 347/239, 241, 255, 256

(56) References Cited

U.S. PATENT DOCUMENTS 4,728,965 A 3/1988 Kessler et al.
5,061,049 A 10/1991 Hornbeck
5,231,388 A * 7/1993 Stoltz .......................... 345/84
5,325,137 A 6/1994 Konno et al.
5,461,410 A 10/1995 Venkateswar et al.
5,461,411 A 10/1995 Florence et al.
5,463,468 A * 10/1995 Takanashi et al. .......... 358/296
5,521,748 A 5/1996 Sarraf
5,626,411 A 5/1997 Takahashi et al.
5,652,661 A 7/1997 Gallipeau et al.
5,701,185 A 12/1997 Reiss et al.
5,715,029 A 2/1998 Fergason
5,721,622 A 2/1998 Venkateswar
5,727,860 A 3/1998 Broer et al.
5,743,610 A 4/1998 Yajima et al.
5,743,612 A 4/1998 Matsuda et al.
5,745,156 A 4/1998 Federico et al.
5,754,305 A 5/1998 DeClerck et al.
5,805,274 A * 9/1998 Saita ........................... 355/38
5,808,800 A 9/1998 Handschy et al.
6,215,547 B1 * 4/2001 Ramanujan et al. .......... 355/67
6,247,816 B1 * 6/2001 Cipolla et al. ................ 353/31
6,330,018 B1 * 12/2001 Ramanujan et al. ........ 347/239
6,407,766 B1 * 6/2002 Ramanujan et al. ........ 347/239
6,580,490 B1 * 6/2003 Wong et al. .................. 355/40
6,628,317 B2 * 9/2003 Enomoto et al. ........... 347/234
6,646,716 B1 * 11/2003 Ramanujan et al. .......... 355/67

* cited by examiner

*Primary Examiner*—Thomas D. Lee
(74) *Attorney, Agent, or Firm*—Nelson Adrian Blish

(57) ABSTRACT

An apparatus and method of printing images (10) onto a photosensitive media (140) using multiple reflective spatial light modulators. In the apparatus and method, illumination optics (25) uniformize and image light from at least one light source through polarization beamsplitting elements (80). The polarization beamsplitting elements (80) divide the illumination light into two polarization states. One polarization state of the illumination light illuminates the reflective spatial light modulators in a telecentric manner. The reflective spatial light modulators are addressed with image data signals. The reflective spatial light modulators modulate the polarized illumination light on a site by site basis and reflect the modulated light back through the polarized beamsplitting elements (80). The modulated light beams are combined to form an image, which is directed through a print lens (110) to expose a photosensitive media (140). The position of the spatial light modulators can be changed, and a new image can be printed.

113 Claims, 10 Drawing Sheets

METHOD AND APPARATUS FOR PRINTING HIGH RESOLUTION IMAGES USING MULTIPLE REFLECTIVE SPATIAL LIGHT MODULATORS

CROSS REFERENCE TO RELATED APPLICATIONS

Reference is made to commonly-assigned copending U.S. patent application Ser. No. 09/606,891, filed Jun. 29, 2000, entitled A METHOD AND APPARATUS FOR CORRECTING DEFECTS IN A SPATIAL LIGHT MODULATOR BASED PRINTING SYSTEM by William Barnick, the disclosure of which is incorporated herein.

FIELD OF THE INVENTION

This invention relates generally to a method for spatially and temporally modulating a light beam and more specifically to forming a high resolution image on photosensitive media using multiple spatial light modulators.

BACKGROUND OF THE INVENTION

Image recording systems write digital data onto photosensitive media by apply light exposure energy. Such energy may originate from a number of different sources and may be modulated in a number of different ways. Image recording systems can be used for digital printing, whereby digital image data is used to print an image onto photographic paper or film.

One of the early methods used for digital printing was cathode ray tube (CRT) based systems. In a CRT-based printer, the digital data is used to modulate the CRT, which provides exposure energy by scanning an electron beam of variable intensity along its phosphorescent screen. This technology has several limitations related to the phosphor and the electron beam. The resolution of this technology is inadequate when printing a large format image, such as 8 inch by 10 inch photographic print. CRT printers also tend to be expensive, which is a severe shortcoming in cost sensitive markets such as photoprocessing and film recording. An additional limitation is that CRT printers do not provide sufficient red exposure to the media when operating at frame rates above 10,000 prints per hour.

Another commonly used approach to digital printing is the laser-based engine shown in U.S. Pat. No. 4,728,965. Digital data is used to modulate the duration of laser on-time or intensity as the beam is scanned by a rotating polygon onto the imaging plane. Such raster scan systems use red, green, and blue lasers. Unfortunately, as with CRT printers, the laser based systems tend to be expensive, since the cost of blue and green lasers remains quite high. Additionally, compact lasers with sufficiently low noise levels and stable output so as to allow for accurate reproduction of an image without introducing unwanted artifacts are not widely available.

One problem with laser based printing systems is that both photographic paper and film are not suitable for a color laser printer due to reciprocity failure. High intensity reciprocity failure is a phenomenon by which both photographic paper and film are less sensitive when exposed to high light intensity for a short period. For example, raster scan laser printers expose each of the pixels for a fraction of a microsecond, whereas optical printing systems expose the paper for the duration of the whole frame time, which can be on the order of seconds. Thus, special paper and film are required for laser printers.

In an effort to reduce cost and complexity of printing systems, as well as avoid reciprocity failure, alternative technologies have been considered for use in digital printing. Among suitable candidate technologies under development are two-dimensional spatial light modulators.

Two-dimensional spatial light modulators, such as the digital micromirror device (DMD) from Texas Instruments, Dallas, Tex., or liquid crystal devices (LCD) can be used to modulate an incoming optical beam for imaging. A spatial light modulator can be considered essentially as a two-dimensional array of light-valve elements, each element corresponding to an image pixel. Each array element is separately addressable and digitally controlled to modulate light by transmitting or by blocking transmission of incident light from a light source by affecting the polarization state of light. Polarization considerations are, therefore, important in the overall design of support optics for a spatial light modulator.

There are two basic types of spatial light modulators in current use. The first type developed was the transmission spatial light modulator, which, as its name implies, operates by selective transmission of an optical beam through individual array elements. The second type, a later development, is a reflective spatial light modulator. As its name implies, the reflective spatial light modulator, operates by selective reflection of an optical beam through individual array elements. A suitable example of a LCD reflective spatial light modulator relevant to this application utilizes an integrated CMOS backplane, allowing a small footprint and improved uniformity characteristics.

Spatial light modulators provide significant advantages in cost, as well as avoiding reciprocity failure. Spatial light modulators have been proposed for a variety of different printing systems, from line printing systems such as the printer depicted in U.S. Pat. No. 5,521,748, to area printing systems such as the system described in U.S. Pat. No. 5,652,661.

A single spatial light modulator such as a Texas Instruments digital micromirror device (DMD) as shown in U.S. Pat. No. 5,061,049 can be used for digital printing applications. One approach to printing using the Texas Instruments DMD, shown in U.S. Pat. No. 5,461,411, offers advantages such as longer exposure times than using light emitting diodes (LED) as a source. Thus, the reciprocity problems associated with photosensitive media during short periods of light exposure are eliminated. However, DMD technology is both expensive and not widely available. Furthermore, DMDs are not easily scaleable to higher resolutions, and the currently available resolution is not sufficient for all digital printing needs.

Several photographic printers using commonly available LCD technology are described in U.S. Pat. Nos. 5,652,661; 5,701,185; and 5,745,156. Most of these designs involve the use of a transmissive LCD modulator such as those depicted in U.S. Pat. Nos. 5,652,661 and 5,701,185. While such methods offer several advantages in ease of optical design for printing, there are several drawbacks to the use of conventional transmissive LCD technology. Transmissive LCD modulators generally have reduced aperture ratios and the use of Transmissive Field-Effect-Transistors (TFT) on glass technology does not promote the pixel to pixel uniformity desired in many printing and film recording applications. Furthermore, in order to provide large numbers of pixels, many high resolution transmissive LCDs possess footprints of several inches. Such a large footprint can be unwieldy when combined with a lens designed for printing or film recording applications. As a result, most LCD printers using transmissive technology are constrained to either low resolution or small print sizes.

To print high resolution 8 inch by 10-inch images with at least 300 pixels per inch requires 2400 by 3000 pixels. Similarly, to print high resolution images onto film requires at least 2000 by 1500 pixels, and can require as much as 4000 by 3000 pixels. Transmissive LCD modulators with such resolutions are not readily available. Furthermore, each pixel must have a gray scale depth to render a continuous tone print uniformly over the frame size, which is not available with this technology.

The use of a reflective LCD serves to significantly reduce the cost of the printing system. Furthermore, the use of an area reflective LCD modulator sets the exposure times at sufficient length to avoid or significantly reduce reciprocity failure.

The progress in the reflective LCD device field made in response to needs of the projection display industry have provided opportunities in printing applications. Thus, a reflective LCD modulator designed for projection display can be incorporated into a printing design with little modification to the LCD itself. Also, by designing an exposure system and data path with an existing projection display device allows incorporation of an inexpensive commodity item into the print engine.

Of the reflective LCD technologies, the most suitable to this design is one that incorporates a small footprint with an integrated Complementary Metal Oxide Semiconductor (CMOS) backplane. The compact size along with the uniformity of drive offered by such a device will translate into better image quality than other LCD technologies. There has been progress in the projection display industry towards incorporating a single reflective LCD, primarily because of the lower cost and weight of single device systems. See U.S. Pat. No. 5,743,612. Of the LCD technologies, the reflective LCD with a silicon backplane can best achieve the high speeds required for color sequential operation. While this increased speed may not be as essential to printing as it is for projection display, the higher speeds can be utilized to incorporate additional gray scale and uniformity correction to printing systems.

The recent advent of high resolution reflective LCDs with high contrast, greater than 100:1, presents possibilities for printing that were previously unavailable. See U.S. Pat. Nos. 5,325,137 and 5,805,274. Specifically, a printer may be based on a reflective LCD modulator illuminated by a lamp, lasers, or by an array of red, green, and blue light emitting diodes. The reflective LCD modulator may be sub-apertured and dithered in two or three directions to increase the resolution.

Reflective LCD modulators have been widely accepted in the display market. Most of the activity in reflective LCD modulators has been related to projection display, such as is disclosed in U.S. Pat. No. 5,325,137. Several projector designs use three reflective LCD modulators, one for each of the primary colors. One such design is shown in U.S. Pat. No. 5,743,610.

It is instructive to note that imaging requirements for projector and display use (as is typified in U.S. Pat. Nos. 5,325,137; 5,808,800; and 5,743,610) differ significantly from imaging requirements for digital printing onto photographic paper or film. Projectors are optimized to provide maximum luminous flux to a screen, with secondary emphasis placed on characteristics important in printing, such as contrast and resolution. To achieve the goals of projection display, most optical designs use high intensity lamp light sources. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as forgiving to artifacts and aberrations and to non-uniformity, since irregularities in optical response are more readily visible and objectionable on printed output. In fact, the gamma of the human eye, when viewing images in a darkened room is approximately 0.8. The gamma associated with a paper print may be 1.6, thus rendering small artifacts more easily visible in printed images. For this reason, there can be considerable complexity in optical systems for providing uniform exposure energy for printing. Even more significant are differences in resolution requirements. Additionally, projectors are often designed to present motion images. When an image is moving, the presence of defects and artifacts may be dynamic. Between the varying image content and the motion of the artifacts themselves, image variations may not be easily perceived by the human eye. However, when the artifacts are stationary as is the surrounding image data, image quality requirements become more stringent.

A preferred approach for digital printing onto photographic paper and film uses a reflective LCD-based spatial light modulator. Liquid crystal modulators can be a low cost solution for applications requiring spatial light modulators. Photographic printers using commonly available LCD technology are disclosed in U.S. Pat. Nos. 5,652,661; 5,701,185 (Reiss et al.), and U.S. Pat. No. 5,745,156 (Federico et al.). Although the present invention primarily addresses use of reflective LCD spatial light modulators, references to LCDs in the subsequent description can be generalized, for the most part, to other types of spatial light modulators, such as the previously noted Texas Instruments DMD device.

Primarily because of their early development for and association with screen projection of digital images, spatial light modulators have largely been adapted to continuous tone (contone) color imaging applications. Unlike other digital printing and film recording devices, such as the CRT and laser-based devices mentioned above that scan a beam in a two-dimensional pattern, spatial light modulators image one complete frame at a time. Using a LCD, the total exposure duration and overall exposure energy supplied for a frame can be varied as necessary in order to achieve the desired image density and to control media reciprocity characteristics. Advantageously, for printing onto photographic paper and film, the capability for timing and intensity control of each individual pixel allows a LCD printer to provide grayscale imaging.

Modulator printing systems can incorporate a variety of methods to achieve gray scale. Texas Instruments employs a time delayed integration system that works well with line arrays as shown in U.S. Pat. Nos. 5,721,622, and 5,461,410. While this method can provide adequate gray levels at a reasonable speed, line printing Time Delayed Integration (TDI) methods can result in registration problems and soft images. Alternate methods have been proposed particularly around transmissive LCDs such as the design presented in U.S. Pat. No. 5,754,305.

Dithering has been applied to transmissive LCD systems due to the less than perfect fill factor. Incorporating dithering into a reflective LCD printing system would allow high resolution printing while maintaining a small footprint.

Also, because the naturally high fill factor present in many reflective LCD technologies, the dithering can be omitted with no detriment to the continuity of the printed image.

Alternative forms of optical dithering are used to improve resolution in display systems incorporating LCD modulators. A calcite crystal or other electro-optic birefringent material can be used to optically shift the path of the image beam, where the amount of shift is dependent on the polarization characteristics of the image. This allows the shifting of one component of the image with respect to a second component of the image that has a different polarization. See U.S. Pat. Nos. 5,715,029 and 5,727,860. In addition to the use of birefringent material, U.S. Pat. No. 5,626,411 uses refraction with isotropic optical media of different indices of refraction to displace one image component from a second image component. These methods of beam displacement are used in a dynamic imaging system and serve to increase resolution by interlacing raster lines to form two lines of sub-images. The two sub-images are imaged faster than is perceivable by the human visual system, so that the individual images are integrated into a composite image as seen by the observer. While these methods are appropriate for projection imaging systems, they are not suitable for a static imaging system such as printing.

While the reflective LCD modulator has enabled low cost digital printing on photosensitive media, the demands of high resolution printing have not been fully addressed. For many applications, such as imaging for medical applications, resolution is critical. Often, the resolution provided by a single reflection LCD modulator is insufficient. It then becomes necessary to create an image wherein multiple images are merged to create a single high-resolution image. Creating a merged image without artifacts along the borders, or in regions where image data may overlap, is desirable. While juxtaposing or spatially interweaving image data alone may have been attempted in previous applications, such a superposition of images with the use of reflective LCDs provides images of high quality without compromising the cost or productivity of the print engine. By utilizing polarization-based modulation, a print engine can utilize light already available in the optical system.

Juxtaposing or spatially interweaving image data has been attempted with some success in projection displays. Fergason, in U.S. Pat. No. 5,715,029, describes a method to improve resolution of a display by altering the beam path using a birefringent medium such as a calcite crystal or an electro-optic liquid crystal cell. For projection applications using a transmissive LCD, Philips Corporation deflects the beam path by using birefringent elements as shown in U.S. Pat. No. 5,727,860. Another method, using isotropic optical elements to juxtapose or spatially interweave images in a projection display using a transmissive LCD, is described in U.S. Pat. No. 5,626,411.

Thus, it is desirable to have a low-cost, high-resolution, high-speed method for digital printing onto a photosensitive media that avoids reciprocity failure and preserves adequate gray scale.

SUMMARY OF THE INVENTION

It is an object of the present invention to provide a method and apparatus for printing images onto a photosensitive media using multiple reflective spatial light modulators. It is a further object of the invention to provide for a high pixel density image at the photosensitive media exposure plane. The present invention is directed at overcoming one or more of the problems set forth in the background of the invention.

Briefly, according to one aspect of the invention, imaging light from at least one light source is imaged through at least one uniformizing optics assembly and a plurality of polarizing beamsplitter elements to create a telecentric illumination at the plane of each of a plurality of reflective spatial light modulator in a digital printing system. The reflective spatial light modulators are comprised of a plurality of modulator sites in a two dimension array. Upon being addressed with image data signals, the reflective spatial light modulators modulate the polarized illumination light on a site by site basis and reflect the modulated light back through the polarized beamsplitting elements. The modulated light beams are combined to form an image, which is directed through a print lens to expose a photosensitive media. In one embodiment, the position of the spatial light modulators is changed and a new image is printed.

In another embodiment plurality of spatial light modulators has distinct in their operation with respect to wavelength of illumination, drive voltage, temperature, image data addressing signal, or aspect ratio. In yet another embodiment in order to improve contrast, polarization elements are incorporated on at least one facet of the polarization beamsplitting elements in the printing system.

According to another aspect of the present invention, a first reflective spatial light modulator is illuminated in a telecentric manner by a first light component, a second reflective spatial light modulator is illuminated in a telecentric manner by a second light component, and a third reflective spatial light modulator is illuminated in a telecentric manner by a third light component.

In yet another aspect of the present invention, a light source is addressed in a series of pulses of varying amplitude and duration to provide illumination of varying light levels to the plurality of reflective spatial light modulators. Thus, the available gray scale of the reflective spatial light modulators is extended.

In a further aspect of the invention, at least one of the spatial light modulators is moved to multiple distinct locations displaced at a distance to be determined by the reflective spatial modulator site size to create multiple images. This approach, referred to as dithering, provides additional resolution at the image plane.

In an additional aspect of the invention, the first, second, and third spatial light modulators are moved in synchronization to dither said first, second, and third modulated light beams.

In yet another aspect of the invention, the print lens assembly is switchable from an assembly that magnifies the complete image onto the photosensitive media to an assembly that demagnifies the complete image onto the photosensitive media. Thus, a small print area can be created with a demagnification print lens assembly, and a larger print area can be created with a magnification print lens assembly.

In a further aspect of the invention, a blur filter is located at in the modulated light beam. The blur filter sufficiently alters the modulated output light beams such as to prevent one from discerning each pixel of an image which is exposed on a photosensitive media.

In an additional aspect of the invention, color sequential illumination results in at least three distinct color images.

In a further aspect of the invention, multiple images are printed monochromatically.

In another aspect of the invention, multiple images are printed simultaneously.

In an additional aspect of the invention, the illumination source is switchable between monochromatic and polychromatic when the photosensitive media so requires a change in the character of the illumination.

A primary advantage of the present invention is the ability to produce high resolution images without reciprocity failure. Furthermore, a reflective LCD modulator is sufficiently fast so that a printer according to the present invention can create gray scale images without time delayed integration. For this reason, an apparatus according to the present invention can cover image artifacts due to image superposition without substantial mechanical or electrical complexity. The bulk of artifact reduction takes place in the software algorithms already designed for image correction.

The illumination system has been described with particular reference to a preferred embodiment utilizing LEDs as the light source. It is understood that alternative light sources and modifications thereof can be effected within the scope of the invention.

The invention and its objects and advantages will become more apparent in the detailed description of the preferred embodiment presented below.

DETAILED DESCRIPTION OF THE INVENTION

The present description will be directed in particular to elements forming part of, or in cooperation more directly with, an apparatus in accordance with the present invention. It is understood that the elements not shown specifically or described may take various forms well known to those skilled in the art.

Figure 1:
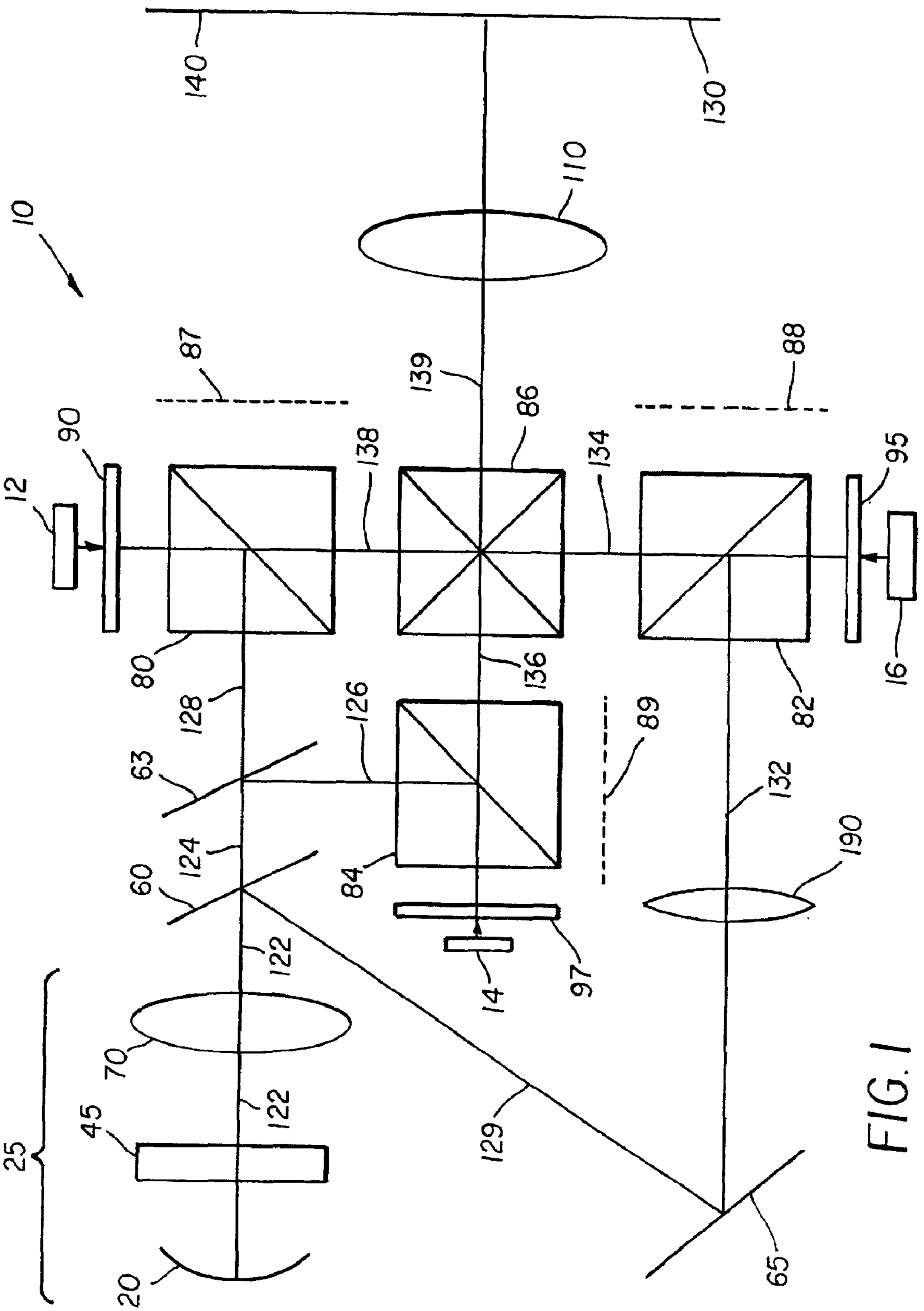
FIG. 1 is a schematic view of a reflective spatial light modulator based printing system using three reflective LCD modulators.

In FIG. 1, the printing apparatus has a light source 20 which produces imaging light. The light is imaged through a uniformizing optics assembly 45 to produce uniformized light 122. The light then passes through a condenser lens 70 designed to produce telecentric illumination at the modulator plane. The light 122 impinges on a beamsplitting element 60, which in a color imaging system may be a dichroic beamsplitter 60. One color component 129 passes via a mirror 65 and a compensation lens 190 to a polarizing beamsplitting cube 82. A first polarizing beamsplitter 82 separates the first light component into a first polarization state and a second polarization state. A first spatial light modulator 95 is illuminated by the first polarization state first light component in a telecentric manner. The first spatial light modulator is addressed with a first image data signal 16. The reflective spatial light modulator is comprised of a plurality of modulator sites in two dimensions. Upon being addressed with the first image data signal, the first reflective spatial light modulator modulates the first polarized first component light on a site by site basis and reflects the modulated light 134 back through the first polarized beamsplitting element.

Following the first dichroic beamsplitting element 60, light 124 comprised of the undeflected color components impinges on a second dichroic beamsplitting element 63. Light 126 of one color component is passed to a second polarizing beamsplitting cube 84. The second polarizing beamsplitter 84 separates the second light component 126 into a first polarization state and a second polarization state. A second spatial light modulator 97 is illuminated by the first polarization state second light component in a telecentric manner. The second spatial light modulator is addressed with a second image data signal 14. The second reflective spatial light modulator is comprised of a plurality of modulator sites in two dimensions. Upon being addressed with the second image data signal, the second reflective spatial light modulator modulates the first polarized second component light on a site by site basis and reflects the modulated light 136 back through the second polarized beamsplitting element 84.

The remaining color component of light 128 impinges on a third polarizing beamsplitter 80 that separates the third light component 128 into a first polarization state and a second polarization state. A third spatial light modulator 90 is illuminated by the first polarization state first light component in a telecentric manner. The third spatial light modulator 90 is addressed with a third image data signal 12. The reflective spatial light modulator is comprised of a plurality of modulator sites in two dimensions. Upon being addressed with the third image data signal, the third reflective spatial light modulator 90 modulates the first polarized third component light 128 on a site by site basis and reflects the modulated light 138 back through the third polarized beamsplitting element. The modulated first, second, and third light beams are directed through a combining prism combining prism 86, such as an x-cube also know as a cross prism element capable of combining the first, second, and third modulated light beams into one homogenized beam 139. A print lens 110 directs the combined light to a photosensitive media 140 at a media plane 130.

Figure 3A:
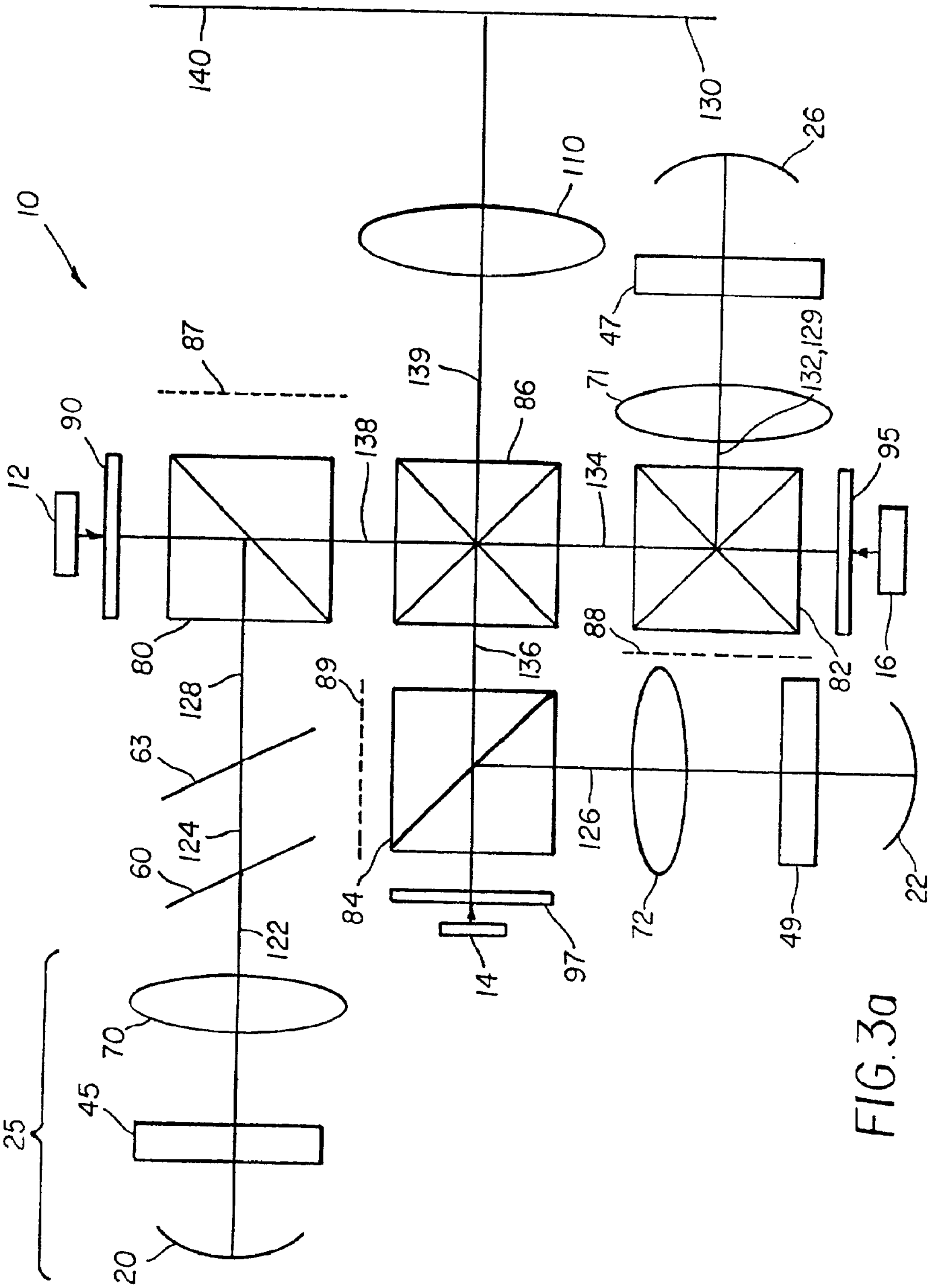
FIG. 3*a* is a schematic view of an alternate embodiment of a reflective spatial light modulator based printing system using three reflective LCD modulators and three independent light sources.

It should be noted that the particular positioning of the spatial light modulator with respect to the beamsplitting cube is a function of required extinction ratio from the beamsplitting cube and preferred mode of operation of the combining prism. Depending on the particular cube, the combiner and coatings employed by each, the modulators may reside as shown in FIG. 3*a* in positions occupied by LCDs 90, 95, 97 or one or more modulators may be located at the corresponding location 87, 88, 89 on the alternate facet of the beamsplitting cube.

In one aspect of the invention, a broadband light source is divided into red, green and blue light components through color filters or a color filter wheel. (To claim this embodiment we have to show it and give the filter wheel a number on a drawing.) Red light 129 is directed through the first polarizing beamsplitter element 82 and illuminates the first reflective spatial light modulator 82 in a telecentric manner. The first reflective spatial light modulator 95 is addressed with image data for the red portion of a color image. The red light is modulated and reflected back through the first beamsplitting 82 element. Similarly, green light is directed through the second polarizing beamsplitter 84 element and illuminates the second reflective spatial light modulator 97 in a telecentric manner. The second reflective spatial light modulator 97 is addressed with image data for the green portion of a color image. The green light is modulated and reflected back through the second beamsplitting element 84. Blue light is directed through the third polarizing beamsplitter element 80 and illuminates the third reflective spatial light modulator 90 in a telecentric manner. The third reflective spatial light modulator 90 is addressed with image data for the blue portion of a color image. The blue light is modulated and reflected back through the third beamsplitting element 80. The modulated red, green and blue light beams are combined in a color recombining x-cube 86 and directed through a print lens 110 to expose a photosensitive media 140.

Figure 2:
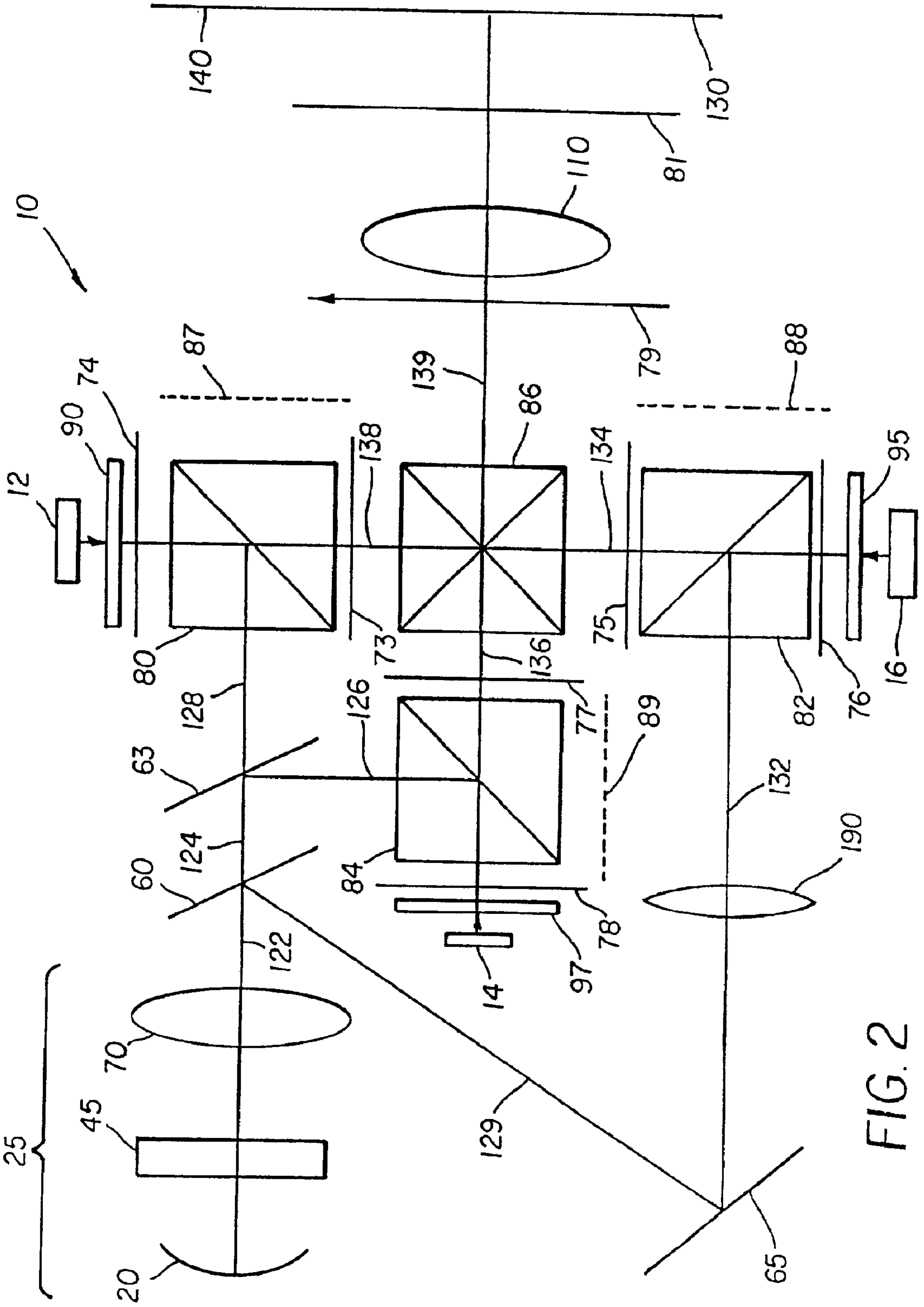
FIG. 2 is a schematic view of a reflective spatial light modulator based printing system using three reflective LCD modulators and three blur filters.

In FIG. 2, the printing apparatus has additional first, second, and third blur filter elements. The filter provides multiple images of each pixel that can be positioned with respect to each other. In FIG. 2, the polarized first modulated light component is passed through a first blur filter 75 to form a first blurred light component. The polarized second modulated light component is passed through a second blur filter 77 to form a second blurred light component. The polarized third modulated light component is passed through a third blur filter 73 to form a third blurred light component. The first, second and third blurred light components are directed towards a combining prism element 86, which combines the components for form a complete image. The complete image is directed through a print lens 110 assembly to expose said photosensitive media 140. The suggested locations and three distinct blur filters are appropriate only if the blur filter is a non-polarization sensitive device.

If a polarization sensitive blur filter is employed, a single filter may be placed at a position 79 either between the combining prism element 86 and the print lens 110, or less preferable at a position 81 following the print lens. It should be noted that if a sufficiently robust blur filter is employed, all three blur filters can be replaced with a single blur filter following the x-cube 86, but preceding the print lens 110. Also, it may advantageous for the blur filter/filters to spin thus moving the secondary spot as a function of time and possibly color. In all the embodiments described throughout, the position of blur filters follows the discussion presented here.

Figure 3B:
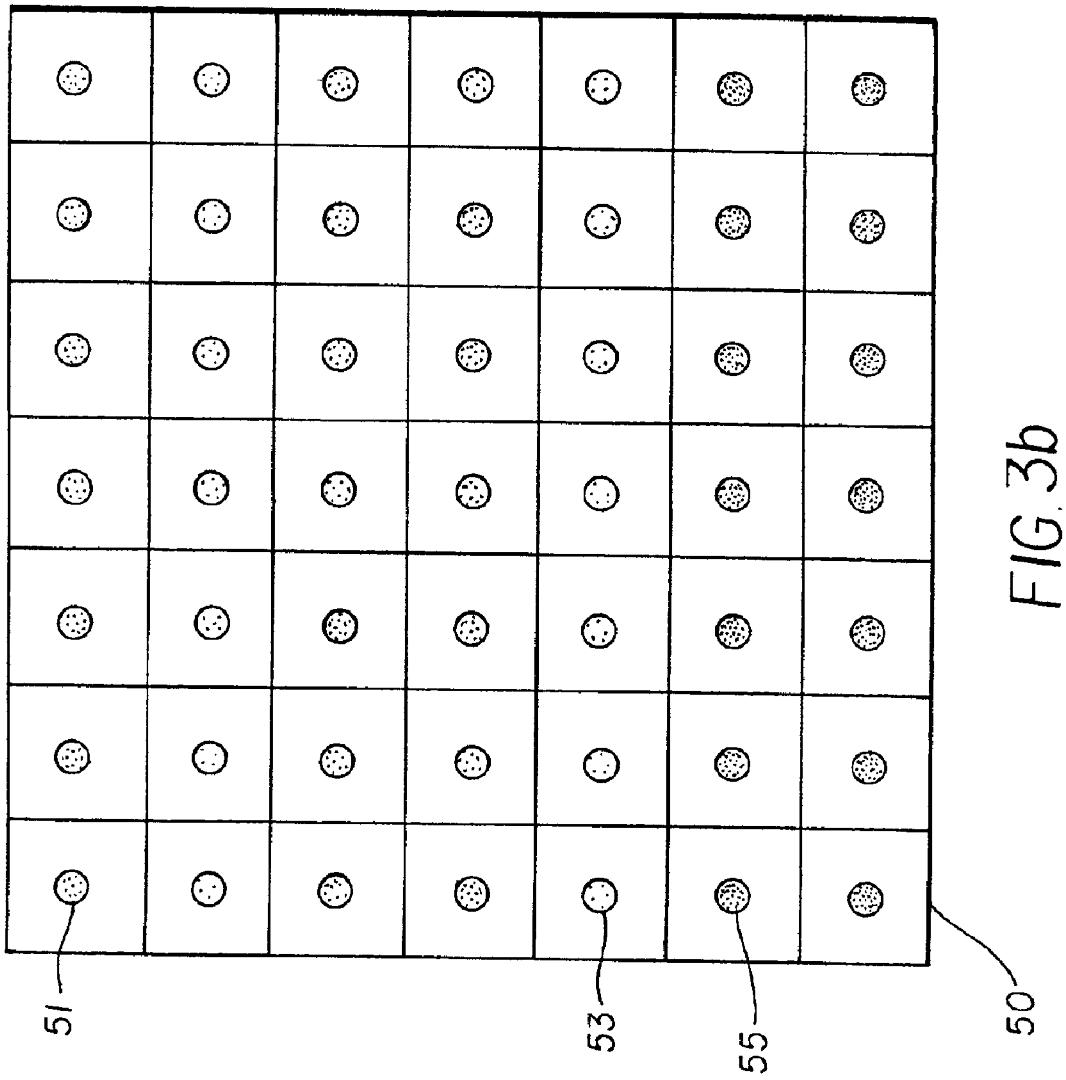
FIG. 3*b* is a LED array followed by a lenslet array.

FIG. 3*a* is a schematic view of a reflective spatial light modulator based printing system using three reflective LCD modulators and three independent light sources. One of the three light sources may emit red light, another may emit green light, and the third may emit blue light. However, in a best mode printing system, the illumination sources would be switchable from one of the red, green or blue primary colors to a single monochromatic source. For example, each illumination source could be an array of red 51, green 53 and blue 55 LEDs possibly followed by a lenslet array 50 as is shown in FIG. 3*b*. Each illumination source 20, 22, 26 could emit one of the primary colors (red, green, or blue), but could be switched such that each might emit only red light. This allows the illumination component of the printing system to be matched to the sensitivity characteristics of the photosensitive media.

In FIG. 3*a*, a first illumination source 26 directs a first wavelength of light towards a uniformizing optics assembly 47 and condenser lens 71 to produce a uniformized first wavelength. The first illumination source can be an array of LEDs, at least one laser, or a broadband light source with filters, which allows said first wavelength of light to pass. The uniformized first wavelength light is directed towards a first polarizing beamsplitter prism 82. The prism divides the light into two different polarization states. One polarization state of light is directed towards a first reflective spatial light modulator 95 to create an essentially telecentric illumination at the first spatial light modulator. The modulator is addressed by a first signal 16 to create a first modulated light beam 134, which is passed back through the first polarizing beamsplitter prism 82.

A second illumination source 22 directs a second wavelength of light towards a uniformizing optics assembly 49 and condenser lens 72 to produce second uniformized wavelength of light. The second illumination source can be an array of LEDs, at least one laser, or a white light source with filters which only allow said second wavelength of light to pass. The uniformized second wavelength of light is directed towards a second polarizing beamsplitter prism 84. The prism divides the second wavelength of light into two different polarization states. One polarization state of the second wavelength light is directed towards a second reflective spatial light modulator 97 to create a telecentric illumination at the second spatial light modulator 97. The modulator is addressed by a second signal 14 to create a second modulated light beam 136, which is passed back through the second polarizing beamsplitter prism 84.

A third illumination source 20 directs a third wavelength of light towards a uniformizing optics assembly 45 and condenser lens 70 to produce a uniformized third wavelength of light 128. The third illumination source can be an array of LEDs, at least one laser, or a broadband light source with filters which only allow said third wavelength of light to pass. The uniformized third wavelength of light is directed towards a third polarizing beamsplitter 80 prism. The prism divides the third wavelength light into two different polarization states. One polarization state of third wavelength light is directed towards a third reflective spatial light modulator 90 to create a telecentric illumination at the third spatial light modulator. The modulator is addressed by a third signal 12 to create a third modulated light beam, which is passed back through the third polarizing beamsplitter prism 90. The first 134, second 136, and third 138 modulated light beams are directed towards a cross-prism 86, which combines the beams to form a complete image. The complete image is directed through a print lens 110 assembly to expose the photosensitive media 140*b*.

Figure 4:
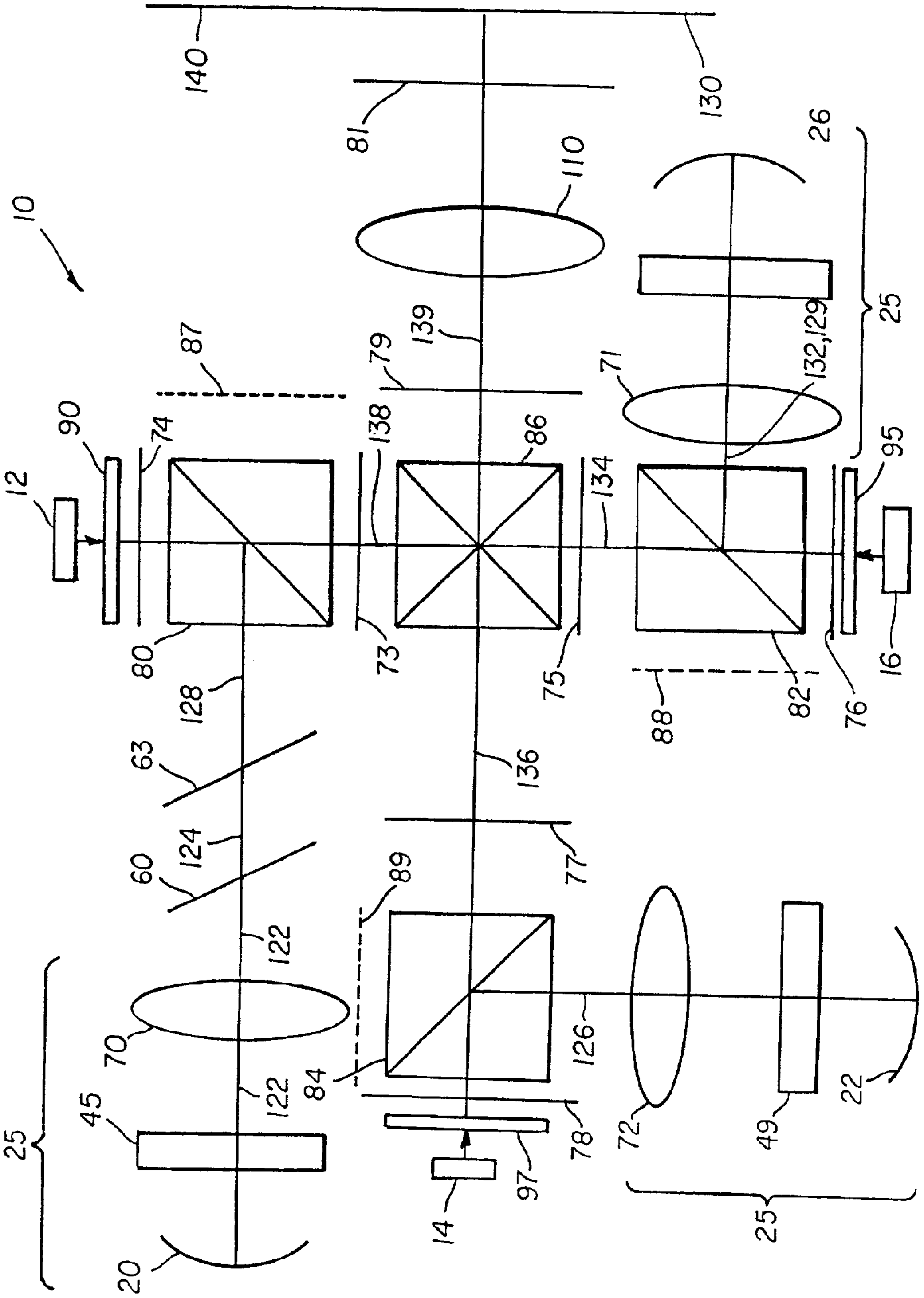
FIG. 4 is a schematic view of a reflective spatial light modulator based printing system using three independent light sources, three reflective LCD modulators, and three blur filters.
Figure 5:
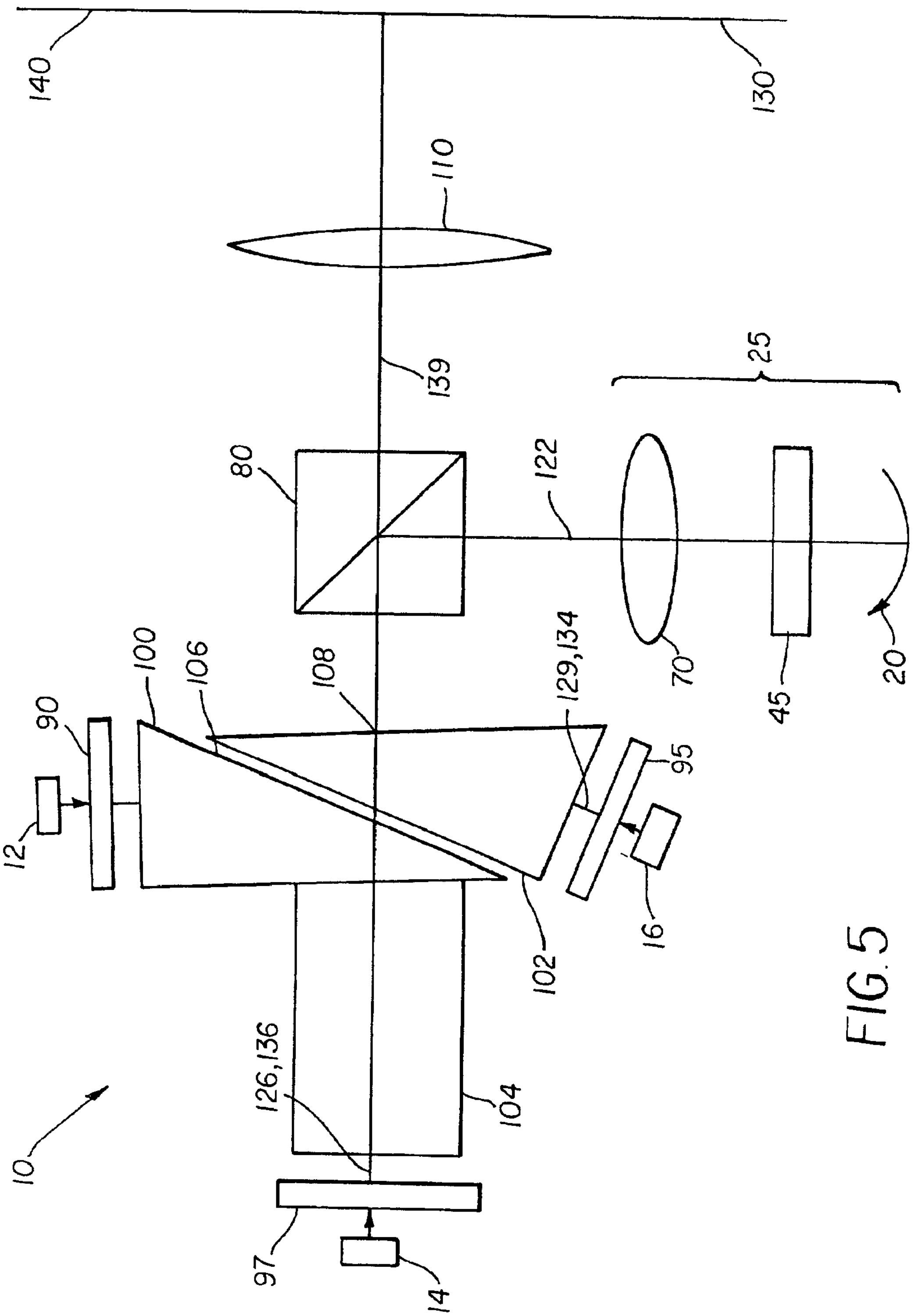
FIG. 5 is a schematic view of an alternate embodiment of a reflective spatial light modulator based printing system using three reflective LCD modulators.

In FIG. 4, the printing apparatus has additional first, second, and third blur filter elements. The filters blur the image such that each individual modulator site would not be visible on the exposed photosensitive media. In FIG. 4, the polarized first modulated light component is passed through a first blur filter 75 to form a first blurred light component. The polarized second modulated light component is passed through a second blur filter 77 to form a second blurred light component. The polarized third modulated light component is passed through a third blur filter 73 to form a third blurred light component. The first, second and third blurred light components are directed towards a combining prism element 86, which combines the components for form a complete image. The complete image is directed through a print lens 110 assembly to expose said photosensitive media 140. As in the previous embodiments, the three blur filters can be replaced with a single blur filter element FIG. 5 shows a schematic of an alternative printing system based on three reflective LCD modulators. A printer apparatus 10 has a light source 20, which is imaged through a uniformizing optics assembly 45 to produce uniformized light. This passes through a condenser lens 70 designed to produce telecentric illumination at the modulator planes. The printer apparatus 51 has a polarizing beamsplitter cube 80 for separating light into two different polarization states. The prism assembly 105 which is comprised of three prisms; first and second prisms 100, 102 with total internal reflection surfaces 106 and 108 separates the light into a first light component 128, a second light component 129, and a third light component 126 which is channeled through a third prism 104. The first light component illuminates a first reflective spatial light modulator 90 in a telecentric manner, the second light component illuminates the second reflective spatial light modulator 95 in a telecentric manner, and the third light component illuminates the third reflective spatial light modulator 97 in a telecentric manner. The prism assembly is comprised of three prisms arranged at angles to provide two different color separating surfaces, each of which having dichroic coatings, that provide the desired light component separation. In addition, the prism assembly recombines the modulated light reflected from each of the three LCD modulators. The printer apparatus further includes a print lens 110 and an imaging plane 130 upon which the desired image is printed onto a photosensitive media 140. It is important to note that the position of the illumination system with the light source and filters shown in FIG. 5 may be exchanged with the projection lens and imaging plane.

In one aspect of the invention, a prism assembly divides a broadband light source into red, green and blue light components. Red light illuminates the first reflective spatial light modulator in a telecentric manner. The first reflective spatial light modulator is addressed with image data for the red portion of a color image. The red light is modulated and reflected back through the prism assembly. Similarly, green light illuminates the second reflective spatial light modulator in a telecentric manner. The second reflective spatial light modulator is addressed with image data for the green portion of a color image. The green light is modulated and reflected back through the prism assembly. Blue light illuminates the third reflective spatial light modulator in a telecentric manner. The third reflective spatial light modulator is addressed with image data for the blue portion of a color image. The blue light is modulated and reflected back through the prism assembly. The modulated red, green and blue light beams are combined and directed through a print lens to expose a photosensitive media.

Figure 6:
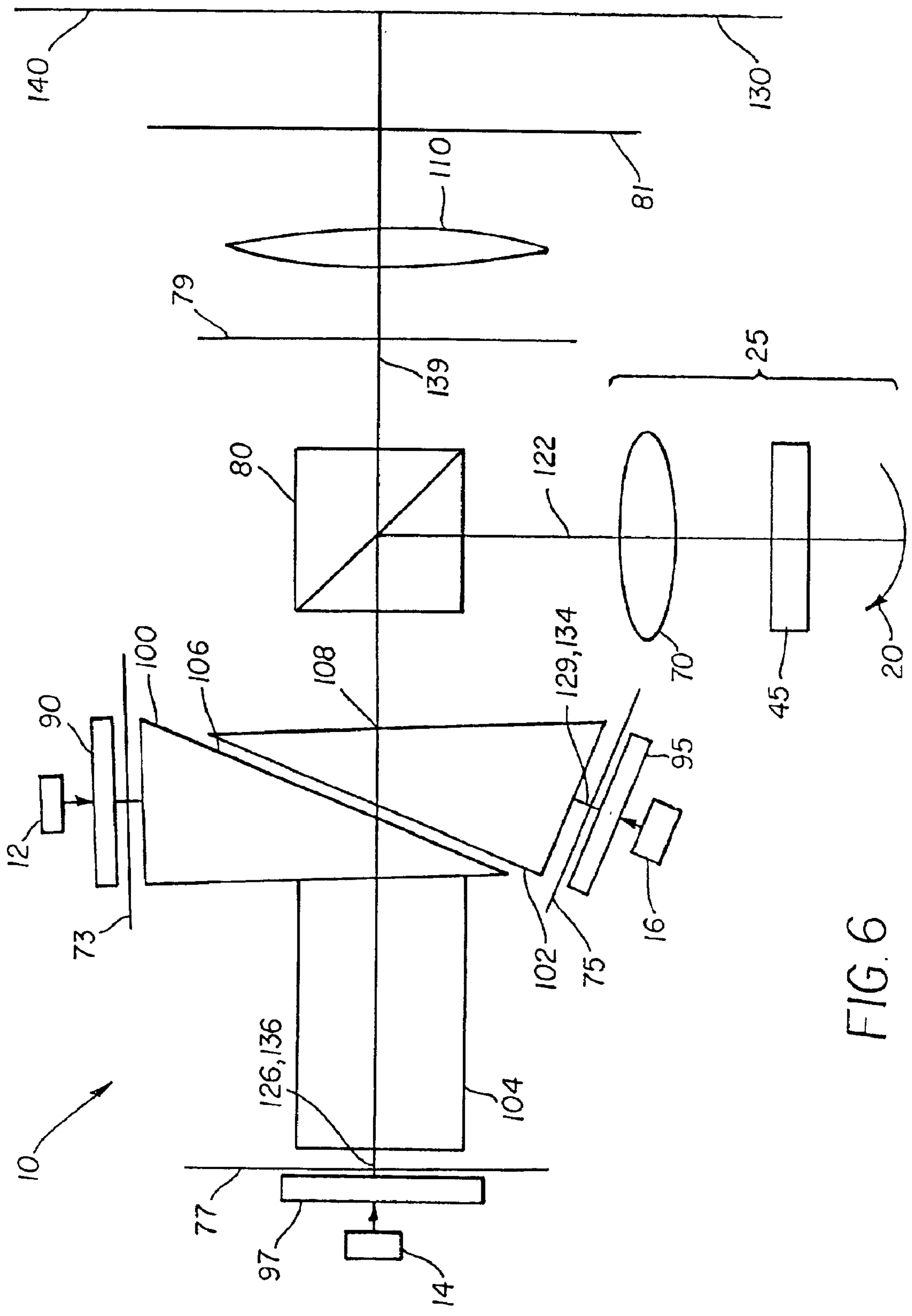
FIG. 6 is a schematic view of an alternate embodiment of a reflective spatial light modulator based printing system using three reflective LCD modulators and three blur filters.

In FIG. 6, the printing apparatus has additional first, second, and third blur filter elements. The filters blur the image such that each individual modulator site would not be visible on the exposed photosensitive media. In FIG. 6, the polarized first modulated light component is passed through a first blur filter 73 to form a first blurred light component. The polarized second modulated light component is passed through a second blur filter 75 to form a second blurred light component. The polarized third modulated light component is passed through a third blur filter 77 to form a third blurred light component. The first, second and third blurred light components are directed towards a combining prism element 80 (???), which combines the components for form a complete image. The complete image is directed through a print lens assembly 110 to expose said photosensitive media 140.

The light source of the printers in FIGS. 1–6 can be a lamp, at least one laser, or a two-dimensional array of red, green and blue LEDs. A single monochromatic light source can be used in the printing system. Such light sources may include, but are not limited to: an array of monochromatic LEDs, at least one laser, or a white light source with filters which only allow one color of light to pass. In the best mode of the printing system, the light source is switchable between monochromatic and polychromatic light. For example, if the illumination source contained an array of red, green and blue LEDs, the red LEDs could be illuminated exclusively. This allows one to adjust the characteristics of the light source to be suitable for the photosensitive media to be exposed. For example, a photosensitive media may be designed to be primarily sensitive to red light, while other types of photosensitive media may be designed to be sensitive to the visible light spectrum. If a monochromatic light source is used, the cross-prism may be used to divide the monochromatic light into three components, rather than separate the light into the primary red, green and blue components.

The uniformizing optics assembly to cover the area of the reflective spatial light modulator maps the light source. Uniformizing optics are designed to provide uniform and telecentric illumination to the modulator planes of the spatial light modulators. Uniformizing optics may consist of, but are not limited to, double sided lenslet arrays, or integrating bars. The design is unique to printing applications because the requirements for uniformity of illumination and uniformity of image are far more stringent in printing than in projection display. The tolerance to roll-off at the edges of the illuminator is much greater in projection than in printing. Telecentricity is required to maintain the uniformity of the image at the image plane because of constraints on spatial light modulator operation. This aspect of the invention sets it apart from systems generally used for projection display. If the light impinging is not telecentric, then modulation across the different angles of incident light is not uniform which will lead to a severe degradation in contrast.

In a color printing system, wherein the first, second and third light components may be red, green or blue light, the printer can includes color and polarization controlling filters for the enhancement and control of color and contrast. These filters may include a polarizer placed in the illumination path between the lamp and the polarizing beam splitter cube and/or a polarizer placed between the polarizing cube and the print lens for additional polarization control and for contrast enhancement. Filters can also be placed between the reflective LCD modulators and the prism assembly.

The first, second and third polarization beamsplitter elements of FIGS. 1–6, referred to in general for the purposes of this application as an optics assembly, may be replaced by other components. For example, the optics assembly may comprise a pellicle or a wire grid polarizer.

Each polarizing beam splitter has such characteristics as to reflect the s-polarized light component but transmit the p-polarized light component. However, each polarizing beam splitter may have reversed characteristics.

The light incident upon the reflective spatial modulators must be linearly polarized, but light reflected having the same polarization is to be excluded from the image-forming beam. Application of a voltage to the reflective spatial light modulators causes a rotation of polarization. The light of polarization rotated relative to the incident beam is selected for forming the image upon the image plane. This is achieved by use of the polarization beam splitter cube designed for use over a wide range of wavelengths of the visible light spectrum and over a suitable range of angular divergence of the beam, typically a number of degrees.

Because polarization beamsplitter elements may not provide adequate extinction between s-polarization state of light (not shown) and p-polarization state of light (not shown), an optical linear polarizer may be incorporated prior to each polarization beamsplitter element. Linear polarizers can be used to isolate the polarization state parallel to the axis of each polarization beamsplitter element. This serves to reinforce the polarization state determined by each polarization beamsplitter element, decrease leakage light and thereby increase the resulting contrast ratio. Light of the s-polarization state passing through each polarization beamsplitter element is directed to the plane of a respective spatial light modulator, which are reflective LCDs in the preferred embodiment. The p-polarization state is passed through polarization beamsplitter elements. It should be noted that the position and coatings of the cubes determine the polarization states. If the beamsplitters or x-cube are coated or placed differently, the polarization states at any given point switch accordingly.

Figure 7A:
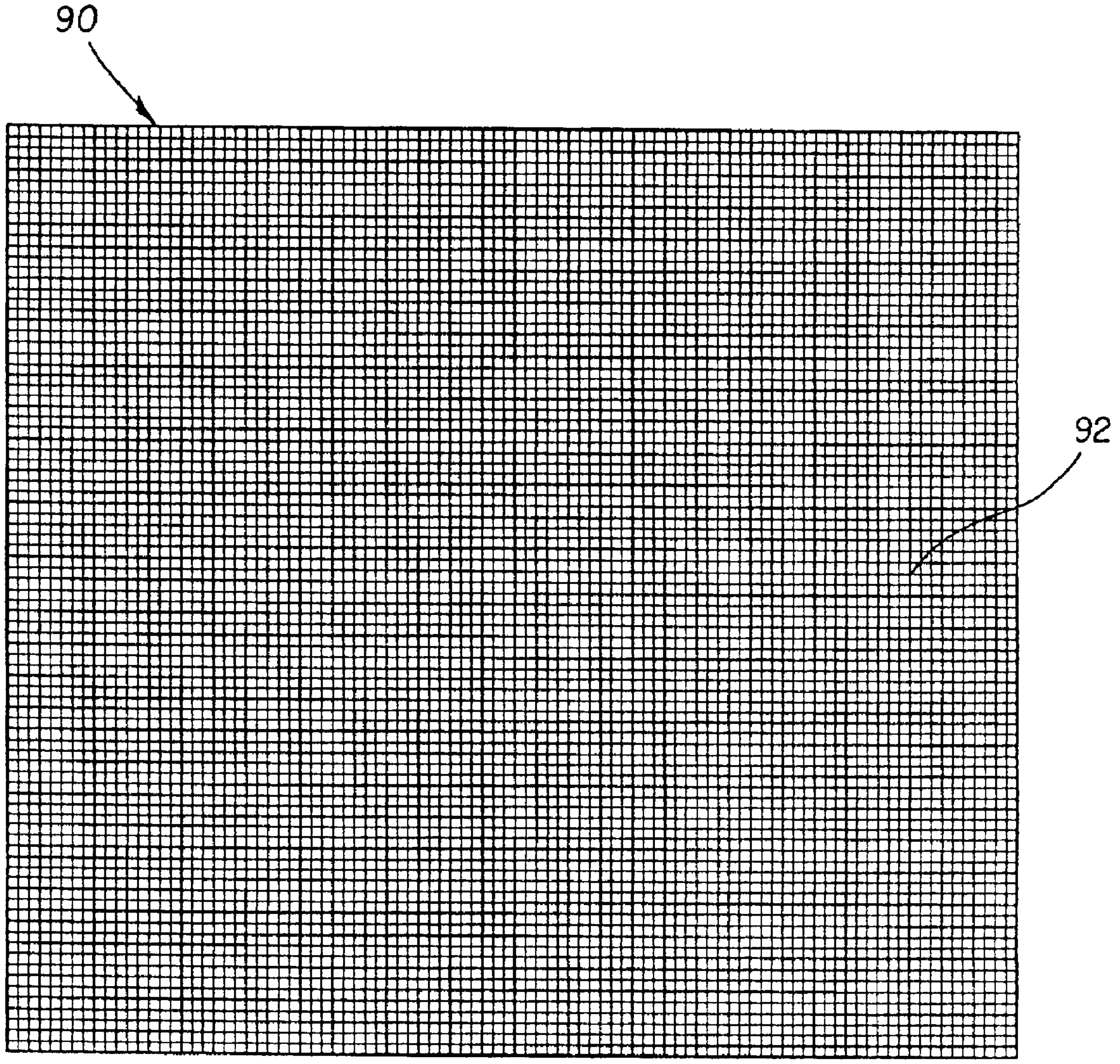
FIGS. 7(*a*) and 7(*b*) are a top plan view and a side view in cross section, respectively, of a reflective LCD modulator.
Figure 7B:
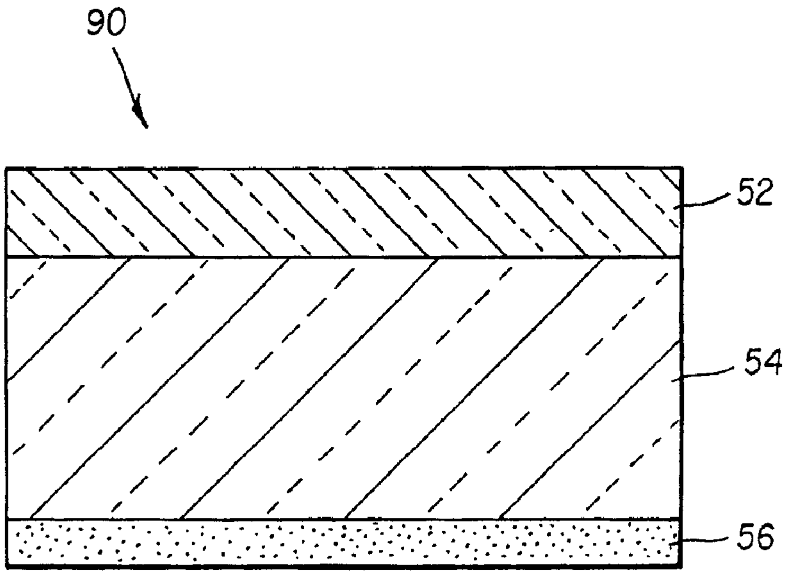

FIGS. 7(*a*) and 7(*b*) show a top view and a side view respectively of a reflective LCD modulator as used in the present invention. The reflective LCD modulator consists of a plurality of modulator sites that are individually modulatable. Light passes through the top surface, liquid crystal material, is reflected off the back plane of the modulator, and returns through the modulator. If a modulator site is "on" or bright, during the round-trip through the reflective LCD modulator, the polarization state of the light is rotated. In an ideal case the polarization state of the light is rotated 90 degrees. However, this degree of rotation is rarely easily achieved. If a given modulator site is "off" or dark, the polarization state of the light is not rotated. The light that is not modulated is not passed straight through the polarized beamsplitter but is redirected away from the light sensitive media plane by the polarized beamsplitter. It should be noted that the polarization state of the light that is rotated by a reflective LCD modulator may become elliptically polarized, however, upon passing through a linear polarizer, the light will regain a linearly polarized state.

The most readily available choice of reflective polarization based spatial light modulators is the reflective LCD modulator. Such modulators, originally developed for use in projection display, can have resolutions as high as 4000×2000 modulator sites. Currently, resolutions of 1200×1600 are available with footprints as small as 0.9 inches diagonal. These high resolution reflective LCD modulators are often twisted nematic LCDs or homeotropically aligned reflective LCD modulators. Other types of reflective LCD modulators, such as ferroelectric modulators, are often employed in projection display. Some of the key characteristics of these LCDs are: high resolution; high contrast (>100:1) in all three primary colors; a fast frame rate of 70 frames per second or higher; and high aperture ratio, i.e. greater than 90%. In addition, the incorporation of a CMOS backplane increases the uniformity across the array. The LCDs are also capable of producing an eight bit gray scale either through pulse width modulation or through analog operation. In either case data may be introduced digitally to the printing system. These characteristics ensure that the reflective LCD modulator is an excellent choice for use in a reflective printing system.

The reflective LCD modulator printing system can be designed in a number of different configurations. The most amenable to a low cost printing system is a single chip system used in color sequential mode. However, a low cost system utilizing three reflective LCD modulators can provide greater throughput of high resolution prints than a single reflective LCD system, while still avoiding reciprocity failure problems. An LCD modulator may be either specifically designed for color sequential use, often incorporating a faster backplane and slightly different liquid crystal compositions, or it can be a single chip with a 60 to 70 frame per second backplane. The latter option is sufficient for printing because the high frame rates are not a necessity and often reduce the bit depth of the resulting image. However, while many liquid crystals are the same basic crystal for all three primary color wavelengths, sometimes, either due to the specific applied voltage or the liquid crystal thickness, operation may differ in the three wavelengths. Specifically, for a given liquid crystal composition, depth, and applied voltage, the resulting polarization rotation on an incident beam may vary with wavelength. The efficiency and contrast of the modulation will vary among the three colors. This optical system is designed to image and pass light with a rotated polarization state. However, the degree of rotation will vary as a function of wavelength. In the bright, or "on" state, this difference in rotation will affect the efficiency of the system. In other words, the percentage of incident light that is actually modulated and imaged on the media plane will vary. This difference in wavelength efficiency can be accounted for by varying the illumination strength, and exposure time. Also, the media requires different power densities in the different wavelengths. More significant problems arise in the dark or "off state." In this state, the polarization state of the light is not rotated and should not be directed thought the polarizing beamsplitter and imaged. If the polarization state of the light is in fact rotated, light will leak through the imaging system and decrease the contrast.

The reflective spatial light modulators contained in the printing system can be selected such that each modulator advantageously handles a particular primary color of light. For instance, one modulator would be more effective at modulating red light, while another modulator would be more effective at modulating green light, and the third modulator would be more effective at modulating blue light. However, if the printing system is constructed such that it is necessary to switch from monochromatic to polychromatic light, it would be desirable to have three spatial light modulator that respond essentially equally to visible light.

In systems that utilize more than one reflective LCD modulator, each of the reflective LCD modulators is distinct, and the activation voltage may differ between the two modulators. Ideally, the behavior of multiple reflective LCD modulators is identical, but processing differences may necessitate tuning the modulators independently. Additionally, because polarization rotation is not perfect at the modulator, care must be taken in the addressing scheme to allow adequate modulation at each device.

The print lens may either magnify or demagnify the complete color image. For example, demagnification is necessary when the photosensitive media to be exposed is photographic film, which may range in widths from 16 mm to 70 mm. Magnification is necessary when the photosensitive media to exposed, such as photographic paper. In the best mode of the invention, the print lens assembly would be switchable on command between providing magnification or demagnification relating to a given image size at the image plane. Thus, it is possible for the printing system to create images corresponding to different print sizes. Ideally, the illumination and modulator assemblies remain unaltered and a different print lens assembly is partitioned.

Because printing is not a real time application, features and methods designed to enhance system operation are available that would not be possible in a real time, or direct viewing application. Specifically, time consuming features such as dithering can be employed. Additionally color balancing and image quality becomes a property of the imaging system in conjunction with the media on which the image is viewed. It is the composite image that is viewed, so the proportion and intensity of light imaged, is determined by the media. What would be considered a good image in a direct view projector is unacceptable in a print and vice-versa.

Composite Image

Creating a balanced composite image comprised of several images provides many challenges both in gray scale generation as well in elimination of artifacts. When multiple spatial light modulators such as LCDs are employed, each LCD transmission and gray scale profile must be mapped. The image data transmitted to each LCD must reflect the characteristics of that device, and of the illumination of the system. For example, the first reflective LCD modulator in FIG. 1 may have higher transmission characteristics than the second or third reflective LCD modulators. The corresponding image data sent to the first LCD must reflect the discrepancy and balance it out.

There are several ways to balance such a discrepancy. First, each device can be loaded with its own electro-optic response curve. The top surface of LCD and backplane of LCD voltages can be set independently. The code values can be mapped differently to the two devices. For example, code value 200 for a first reflective LCD modulator may actually be a shorter pulse duration in a pulse width scheme or a lower drive voltage in analog scheme than code 200 for a second reflective LCD modulator. If the second reflective LCD modulator does not have an equal transmission characteristic to the first LCD modulator, or the net light level reaching or departing the second reflective LCD modulator is lower than the first reflective LCD modulator, such correction in voltage would be required. Each device will require its own gray scale calibration. It is possible for devices that are mapping 14–16 bit tables to an 8 bit device, and then the same driver board may be employed, with different mappings of the two devices. In the case of interwoven images, this balancing is the primary adjustment.

Nonuniformity

A digital printing system must also correct non-uniformities in an image. The exposure system can correct for some non-uniformities such as roll-off at the modulator edges. One way to accomplish this is to introduce additional image data to the modulator activating only the edge modulator sites. These images are exposed and superimposed on the other images thus giving additional depth to the edge regions. For example, a series of images taken at the three reflective LCD modulators could be scanned, data maps could be created, and all input data with initial maps of the three reflective LCD modulators could be combined to correct the image. Similar techniques can be used to adjust for modulator non-uniformities that are known prior to operation.

Artifacts

A digital printing system must also be concerned with image quality and the presence of artifacts. In the case of image juxtaposition of images, the image data needs to reflect the gray scale, the device uniformity, and the regions of overlap need to be balanced with the non-overlapped regions of the image.

In digital printing systems utilizing multiple LCDs, the gray scale in the region of overlapped or interwoven images needs to be established as a function of both devices. This may require a different electro-optic curve for that region or simply a different mapping of code values. Such an algorithm may require use of multiple exposures to isolate overlap data from non-overlap data. If this is not possible the image data should be adjusted or offset such that the composite image produces the same gray scale as non-overlapped regions.

Dithering

Dithering may be used to increase the inherent LCD resolution and to compensate for modulator site defects. A dithering pattern for a standard high aperture ratio reflective spatial light modulator is shown in FIGS. 8*a*–8*d.*

To dither a full aperture reflective spatial light modulator is to image the spatial light modulator at one position, and reposition the reflective spatial light modulator a fraction of a modulator site distance away and image. In so doing, multiple copies of the same images are created and overlapped. By overlapping multiple images, the system acquires a redundancy that corrects for modulator site failure or drop out. Furthermore, interpolating or updating the data between positions increases the effective resolution.

Referring to the example dithering scheme depicted in FIGS. 8*a*–8*d,* to dither a reflective LCD modulator, the modulator is imaged at one position, the modulator is repositioned a fraction of a modulator site distance away or multiple number of modulator site widths away, and imaged. In so doing, multiple images are created and overlapped. By overlapping multiple images, the system acquires a redundancy that corrects for modulator site failure or drop out. Furthermore, interpolating and updating the data between positions increase the effective resolution.

Figure 8:
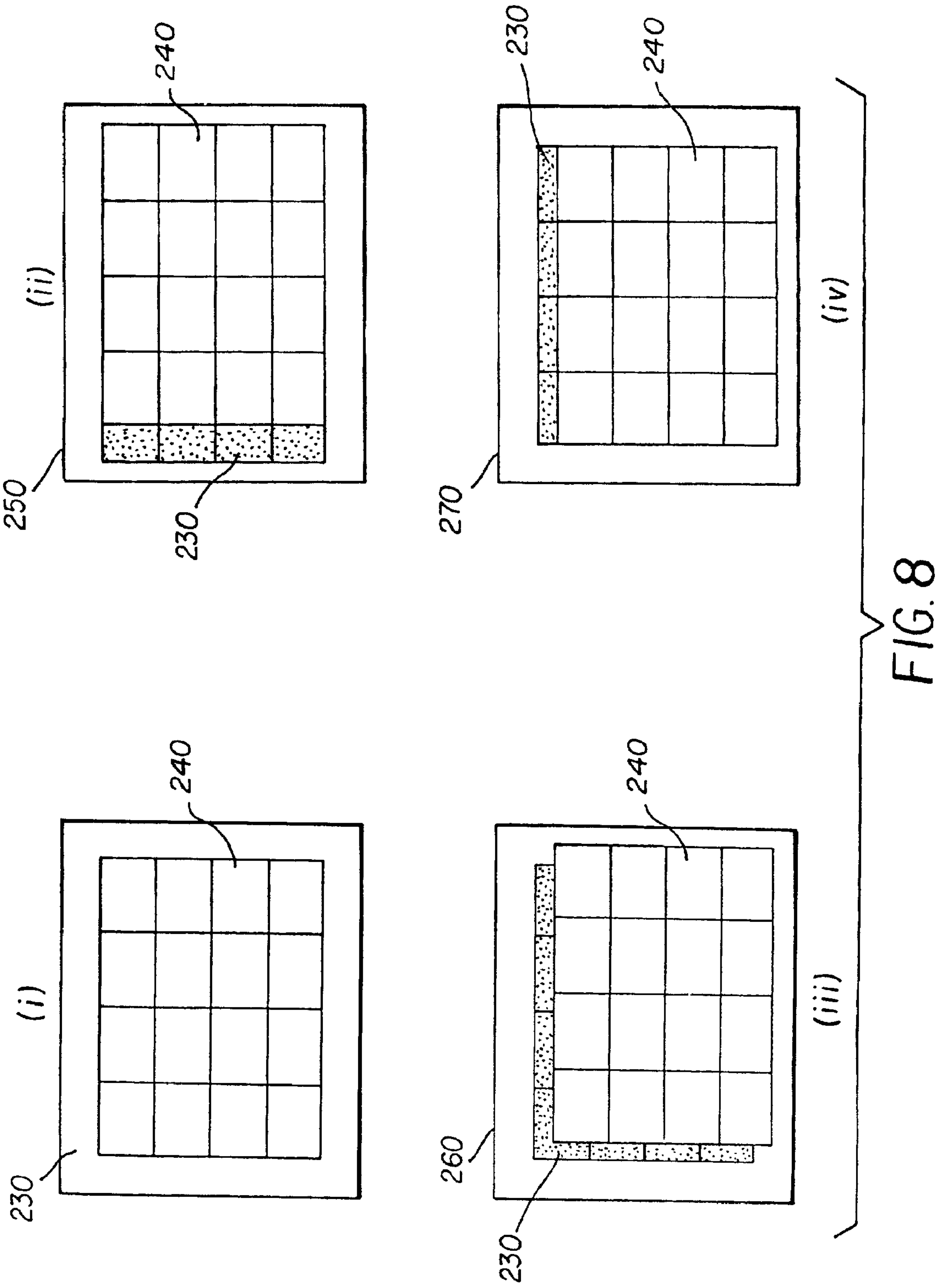
FIG. 8 illustrates the effect of dithering an un-apertured spatial light modulator using four distinct image positions.

One particular dithering scheme is depicted in FIG. 8. The reflective LCD modulator 90 is positioned at an initial position 230 and imaged. The reflective LCD modulator 90 is moved to a second modulator position 250 one half of a modulator site laterally displaced from the initial LCD position 230. The reflective LCD modulator 90 is imaged at that position. The reflective LCD modulator 90 is then displaced to a third modulator position 260 one half of a modulator site longitudinally from the second modulator position 250, which means it is diagonally displaced from the initial LCD image 230. The reflective LCD modulator 90 is illuminated and the media exposed again. The reflective LCD modulator 90 is then moved to a fourth modulator position 270 that is laterally displaced from the third modulator position 260. The media is exposed at this position. Effectively, there is a four fold increase in the amount of data written. This serves to increase image resolution and provide means to further sharpen images. With a high aperture ratio, it may be sufficient to simply dither in one diagonal direction to achieve comparable results.

Dithering requires motion of the LCD in two directions in a plane. Each motion is approximately between 5 $\mu$m and 20 $\mu$m for a typical reflective LCD modulator. In order to achieve this motion, many different actuator or motion assemblies can be employed. For example, the assembly can use two piezo-electric actuators.

Using this pattern, there is effectively a fourfold increase in the amount of data written. This serves to increase image resolution and provide means to further sharpen images. Alternately, with a high aperture ratio, it may be sufficient to simply dither in one diagonal direction. For example, from first modulator position shown in FIG. 8*a* to third position modulator shown in FIG. 8*d* in order to achieve suitable results.

In an alternate embodiment for dithering, requiring minimum modification to a reflective LCD device designed for projection display, the device can be sub-apertured. In an effort to markedly increase resolution, the modulator can contain an aperture ratio that is relatively small. Ideally this aperture must be symmetrically placed within each modulator site. The result is a modulator site for which only a fraction of the area transmits light.

The printing apparatus is capable of achieving sufficient uniformity while retaining the grayscale performance. The reflective spatial light modulators alone can receive up to 8 bits of bit depth. However, 8 bits to the modulator may not translate to 8 bits at the media. Furthermore, LCD modulators are known to exhibit some measure of roll-off or loss of contrast at the edges of the device. To print an adequate grayscale range and provide additional bit depth, it is possible to create a single image at the photosensitive media as a super-position of a series of images. The individual images that comprise the final image can vary both in information content and illumination.

It is possible to maintain the same image data at the reflective spatial light modulators and, by altering the illumination level from at least one light source, introduce additional bit depth. By varying the illumination level, (and/or duration), and by altering the data content controlling spatial light modulator, the printing apparatus can form a composite image out of a series of preliminary images. The superposition of the images of varied information content and varied illumination level introduces additional bit depth to the composite image.

If dithering is employed gray scale generation, uniformity correction, and artifact reduction should be mapped as a function of the dither. Because of the digital addressability of the reflective LCD modulator and the pulsed LED illumination method of illumination, this approach to printing provides an adequate bit depth and reasonable timing for use in a photographic printer.

Temperature Control

Figure 9:
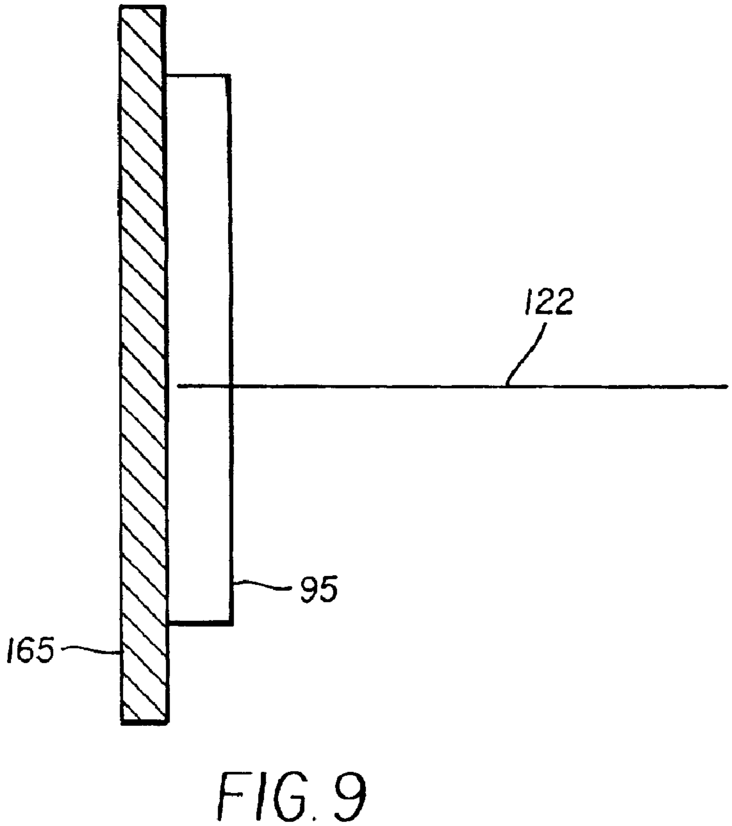
FIG. 9 is a spatial light modulator with a temperature control device located behind it.

When utilizing a spatial light modulator, care must be taken to ensure the proper operating conditions of the modulator. Many modulators and LCDs are sensitive to variations in temperature. In a printing system, a 10 degree C shift in temperature, can lead to a 10 code value, or 3% reflectance shift in operation. When faced with temperature variations, there are two alternatives. One alternative is to recalibrate to account for changes. This maybe accomplished at a given time or temperature interval. The other alternative is to hold the temperature constant. The temperature of reflective device 95 can be controlled either by cooling or heating the device with element 165 as is shown in FIG. 9. In one case a thermo-electric cooler can be mounted on the back of the device. Alternatively, a heater may be placed on the device. Reflective LCDs often operate faster, and more efficiently when warm. So, heating the device to a given temperature, and holding the temperature is a solution to thermal drift problems.

When heating or cooling the device, it is important to do so in a manner that does not introduce either stress or uneven thermal patterns to the device. In either case, variations in the operating condition of the device lead to image non-uniformities and calibration differences. Aside from immediate issues with stress and temperature gradients, care must be taken to ensure that as the temperature of the surroundings and device change, that the thermal control methods do not expand and contract in a manner that creates stress variations to the device. It is sometimes preferable to use a heater than a thermo-electric cooler to control the temperature of the device. It may also be necessary to defect correct or uniformity correct image data as a function of temperature.

Intermediate Image Data

When printing, there is a time between prints when the media is repositioned. Also, when printing color sequentially, there is a brief time between colors. It is advantageous to use these intermediate times to remove any residual images from the modulator. This can be accomplished in a variety of different ways. The modulator and/or the corresponding light source may be turned to an off or low state in the intermediate time. Alternatively, the modulator can be turned to a fully charged state, while the light source is off or shuttered off. This mode would allow use of the faster switching time associated with charging a capacitor. The modulator may be charged to any intermediate level.

In a more complicated method of operation, the device may be loaded with data specific to prior or future image content to provide best operation.

Additionally, if the system is used in a color sequential manner, the backplane voltages may need to vary as a function of color. The intermediate time is a good time to switch voltages such that the changes will settle out before the following image is refreshed that the device.

The invention has been described in detail with particular reference to certain preferred embodiments thereof, but it will be understood that variations and modifications can be effected within the scope of the invention.

PARTS LIST

10. Printing system
20. Light source
22. Light source
26. Light source
25. Illumination system
45. Uniformizing optics
47. Uniformizing optics
49. Uniformizing optics
50. Lenslet array
51. Printer apparatus
52. ITO
54. LCD
56. Backplane of LCD
60. Dichroic beamsplitter
63. Dichroic beamsplitter
65. Dichroic beamsplitter
70. Telecentric condenser lens
71. Telecentric condenser lens
72. Telecentric condenser lens
73. Blur filter/wavelength compensation devices
75. Blur filter/wavelength compensation devices
77. Blur filter/wavelength compensating device
80. Polarizing beamsplitter
82. Polarizing beamsplitter
84. Polarizing beamsplitter
86. Combining prism
90. Reflective LCD modulator
95. Reflective LCD modulator
97. Reflective LCD modulator
92. Modulator site
95. Reflective LCD modulator
100. First prism
102. Second prism
104. Third prism
105. Printer assembly
106. Total internal reflection surface
108. Total internal reflection surface
102. Center of LCD 95
110. Print lens assembly
120. Analyzer

122. Incident light
124. Light following first splitter
126. Light state 2
128. Light state
129. Light state 3
130. Image plane
134. Modulated light state 3
136. Modulated light state 2
138. Modulated light state 1
139. Color recombined light
140. Light sensitive media
190. Compensation lens
230. Initial LCD position
240. Modulator sites
250. Second modulator position
260. Third modulator position
270. Fourth modulator position

What is claimed is:

1. A method of printing a high resolution image onto a photosensitive media using multiple reflective spatial light modulators comprising the steps of:

uniformizing light from a light source through a uniformizing optics assembly to form uniform illumination at a plurality of spatial modulators;

dividing said uniformized light into a first light component, a second light component and a third light component;

passing said first light component through a first polarization beamsplitter element to produce a first polarization state of said first light component and a second polarization state of said first light component;

passing said first polarized component light to a first spatial light modulator to create a telecentric illumination at said first spatial light modulator;

addressing said first spatial light modulator with a first image data signal to create a modulated first light component beam;

passing said modulated first light component beam through said first polarization beamsplitter element to form a polarized first modulated light component;

passing said second light component through a second polarization beamsplitter element to produce a first polarization state of second light component and a second polarization state of said second light component;

passing said first polarized second component light to a second spatial light modulator to create a telecentric illumination at said second spatial light modulator;

addressing said second spatial light modulator with a second image data signal to create a modulated second light component beam;

passing said modulated second light component through said second polarization beamsplitter element to form a polarized second modulated light component;

passing said third light component through a third polarization beamsplitter element to produce a first polarization state of said third light component and a second polarization state of said third light component;

passing said first polarized third light component to a third spatial light modulator to create a telecentric illumination at said third spatial light modulator;

addressing said third spatial light modulator with a third image data signal to create a modulated third light component beam;

passing said modulated third light component through said third polarization beamsplitter element to form a polarized third modulated light component;

directing said modulated first, second and third modulated light components towards a combining prism element;

combining said modulated first, second and third component light beams with said combining prism to form a complete image;

directing said complete image through a print lens assembly to expose said photosensitive media;

passing said polarized first modulated light component through a first blur filter to form a first blurred light component;

passing said polarized second modulated light component through a second blur filter to form a second blurred light component;

passing said polarized third modulated light component through a third blur filter to form a third blurred light component;

directing said first, second and third blurred light components towards a combining prism element;

combining said blurred first, second and third component light beams with a combining prism to form a complete image; and directing said complete image through a print lens assembly to expose said photosensitive media.

2. A method according to claim 1, wherein said first light component is red light.

3. A method according to claim 1, wherein said second light component is green light.

4. A method according to claim 1, wherein said third light component is blue light.

5. A method according to claim 1, wherein said light source is a monochromatic light source.

6. A method according to claim 1, wherein said light source is switchable from imaging monochromatic light to imaging polychromatic light.

7. A method according to claim 1, wherein said light source provides imaging light which matches a media sensitivity of said photosensitive media.

8. A method according to claim 1, wherein said light source is provided for a period of time which matches a media sensitivity of said photosensitive media.

9. A method according to claim 1, wherein said separating of uniformized imaging light into first, second, and third light components is achieved with filters.

10. A method according to claim 1, wherein said light source is a halogen light source.

11. A method according to claim 1, wherein said light source is a broadband visible source.

12. A method according to claim 1, wherein said light source is a two dimensional array of red, green, and blue LEDs.

13. A method according to claim 12, wherein at least one of said LEDs has a single sided lenslet array.

14. A method according to claim 1, wherein said light source is at least one laser.

15. A method according to claim 1, comprising the further step of varying an illumination level of said light source.

16. A method according to claim 1, comprising the further step of varying the duration of exposure time.

17. A method according to claim 1, comprising the further steps of:

creating an image by exposing said photosensitive media;

repositioning said photosensitive media; and exposing said photosensitive media.

18. A method according to claim 17, wherein at least one of said spatial light modulators is turned off while said photosensitive media is being repositioned.

19. A method according to claim 17, wherein at least one of said spatial light modulators is turned to a fully charged state while said photosensitive media is being repositioned.

20. A method according to claim 17, wherein at least one of said spatial light modulators is charged to an intermediate level to remove residual image data while said photosensitive media is being repositioned.

21. A method according to claim 1, wherein said first, second and third signals are processed simultaneously.

22. A method according to claim 1, wherein said signals address said spatial light modulators for a period of time which matches a media sensitivity of said photosensitive media.

23. A method according to claim 1, wherein the temperature of a least one spatial light modulator is modified to match a media sensitivity of said photosensitive media.

24. A method according to claim 1, wherein said first, second, and third signals to address said first, second, and third spatial light modulators are divided into separate bitplanes.

25. A method according to claim 1, comprising the further step of varying the backplane voltage of each spatial light modulator.

26. A method according to claim 1, wherein said first, second, and third spatial light modulators are each optimized for a discrete range of visible light wavelengths.

27. A method according to claim 1, wherein said first spatial light modulator is optimized for red light, said second spatial light modulator is optimized for green light, and said third spatial light modulator is optimized for blue wavelengths.

28. A method according to claim 1, wherein said spatial light modulators include a plurality of modulators sites, said modulator sites being adapted to rotate a polarization state of incident light, and reflect said light through said spatial light modulators and back to said polarization beamsplitter elements.

29. A method according to claim 28, comprising the further steps of:

moving at least one said spatial light modulator a distance of between p/4 to 3p/4 wherein p is the size of an individual modulator site; and imaging said photosensitive media with new image data.

30. A method according to claim 28, wherein at least one said spatial light modulator is mounted on a frame which is movable in at least two directions.

31. A method according to claim 1, wherein said first, second, and third spatial light modulators are moved in synchronization.

32. A method according to claim 1, wherein at least one of said blur filters is rotated.

33. A method according to claim 1, wherein at least one of said blur filters is rotated.

34. A method according to claim 1, wherein the print lens assembly magnifies the complete image onto said photosensitive media.

35. A method according to claim 1, wherein the print lens assembly demagnifies the complete image onto said photosensitive media.

36. A method according to claim 1, wherein the print lens assembly is switchable between an assembly that magnifies an image to one that demagnifies an image onto said photosensitive media.

37. A method according to claim 1, wherein at least one of said spatial light modulators is temperature controlled.

38. A method according to claim 1, wherein at least one of said spatial light modulators has a temperature maintained at a level above ambient temperature to increase an efficiency of said at least one spatial light modulator.

39. A method of printing an image onto a photosensitive media comprising the steps of:

Uniformizing light from a light source by passing said light through a uniformizing optics assembly to form uniform illumination at a plurality of spatial light modulators;

passing said first uniformized imaging light through a first polarization beamsplitter element to produce a first polarization state of said first imaging light and a second polarization state of first imaging light;

directing said first polarized first imaging light to a first spatial light modulator to create a telecentric illumination at said first spatial light modulator;

addressing said first spatial light modulator with a first signal to create a first modulated light beam;

passing said first modulated light beam back through said first polarizing beamsplitting element to form a polarized first modulated light beam;

imaging a second light wavelength from a second light source through a uniformizing optics assembly to form a second uniformized imaging light;

passing said second uniformized imaging light through a second polarization beamsplitter element to produce a first polarization state of said second imaging light and a second polarization state of said second imaging light;

directing said first polarized second imaging light to a second spatial light modulator to create a telecentric illumination at said second spatial light modulator;

addressing said second spatial light modulator with a second signal to create a second modulated light beam;

passing said second modulated light beam back through said second polarizing beamsplitter element to form a polarized second modulated light beam;

imaging a third light wavelength from a third light source through a uniformizing optics assembly to form a third uniformized imaging light;

passing said third uniformized imagine light through a third polarization beamsplitter element to produce a first polarization state of said third imaging light and a second polarization state of said third imaging light;

directing said first polarized third imaging light to a third spatial light modulator to create a telecentric illumination at said third spatial light modulator;

addressing said third spatial light modulator with a third signal to create a third modulated light beam;

passing said third modulated light beam back through said third polarizing beamsplitting element to form a polarized third modulated light beam;

directing said first, second and third modulated light beams to a cross prism element;

combining said first, second, and third blurred light beams with said combining prism to form a complete image;

directing said complete image through a print lens assembly to expose said photosensitive media; and passing said polarized first modulated light component through a first blur filter to form a first blurred light component;

passing said polarized second modulated light component through a second blur filter to form a second blurred light component;

passing said polarized third modulated light component through a third blur filter to form a third blurred light component;

directing said first, second and third blurred light components towards said combining prism element;

combining said blurred first, second and third blurred light component beams with a combining prism to form a complete image; and directing said complete image through a print lens assembly to expose said photosensitive media.

40. A method according to claim 39, wherein said first light source emits red light.

41. A method according to claim 39, wherein said second light source emits green light.

42. A method according to claim 39, wherein said third light source emits blue light.

43. A method according to claim 39, wherein at least one said light source is a monochromatic light source.

44. A method according to claim 39, wherein at least one said light source is switchable from emitting monochromatic light to emitting polychromatic light.

45. A method according to claim 39, wherein said light sources provide imaging light which matches a media sensitivity of said photosensitive media.

46. A method according to claim 39, wherein said light sources are provided for a period of time which matches a media sensitivity of said photosensitive media.

47. A method according to claim 39, wherein said first light source is a halogen light source with a filtering apparatus that allows only red light to be emitted; wherein said second light source is a halogen light source with a filtering apparatus that allows only green light to be emitted; and wherein said third light source is a halogen light source with filtering that allows only blue light to be emitted.

48. A method according to claim 39, wherein said first light source is a broadband visible light source with a selective filtering apparatus that allows red, green or blue light to be emitted; wherein said second light source is a broadband visible light source with a selective filtering apparatus that allows only red, green, or blue light to be emitted; and wherein said third light source is a broadband light source with a selective filtering that allows only red, green or blue light to be emitted.

49. A method according to claim 39, wherein said first light source is a two dimensional array of red LEDs; wherein said second light source is a two dimensional array of green LEDs; and wherein said third light source is a two dimensional array of blue LEDs.

50. A method according to claim 39, wherein said first, second and third light sources are a two dimensional array of red, green and blue LEDs.

51. A method according to claim 39, wherein said first light source is at least one laser capable of emitting red light; wherein said second light source is at least one laser capable of emitting green light; and wherein said third light source is at least one laser capable of emitting blue light.

52. A method according to claim 39, wherein said first, second and third light sources consist of at least one laser capable of emitting red, green or blue light.

53. A method according to claim 39, comprising the further step of varying the illumination level of at least one of said light source.

54. A method according to claim 39, comprising the further step of varying the duration of exposure time.

55. A method according to claim 39, comprising the further steps of:

creating an image by exposing said photosensitive media;

repositioning said photosensitive media; and exposing said photosensitive media.

56. A method according to claim 39, wherein said first, second and third signals are processed simultaneously.

57. A method according to claim 39, wherein said signals address said spatial light modulators for a period of time which matches a media sensitivity of said photosensitive media.

58. A method according to claim 39, wherein the temperature of a least one spatial light modulator is modified to match a media sensitivity of said photosensitive media.

59. A method according to claim 39, wherein said first, second, and third signals to address said first, second, and third spatial light modulators are divided into separate bitplanes.

60. A method according to claim 39, comprising the further step of varying the backplane voltage of each spatial light modulator.

61. A method according to claim 39, wherein said first, second, and third spatial light modulators are each optimized for a discrete range of visible light wavelengths.

62. A method according to claim 39, wherein said first spatial light modulator is optimized for red light, said second spatial light modulator is optimized for green light, and said third spatial light modulator is optimized for blue light.

63. A method according to claim 39, wherein said spatial light modulators include a plurality of modulators sites, said modulator sites being adapted to rotate a polarization state of incident light, and reflect said light through said spatial light modulators and back to said polarization beamsplitter elements.

64. A method according to claim 63, comprising the further steps of:

moving at least one of said spatial light modulators a distance of between p/4 to 3p/4 wherein p is the size of an individual modulator site; and imaging said photosensitive media with new image data.

65. A method according to claim 63, wherein at least one of said spatial light modulators is mounted on a frame which is movable in at least two directions.

66. A method according to claim 63, wherein said first, second, and third spatial light modulators are moved in synchronization.

67. A method according to claim 39, wherein the print lens assembly magnifies the complete image onto the photosensitive media.

68. A method according to claim 39, wherein the print lens assembly demagnifies the complete image onto the photosensitive media.

69. A method according to claim 39, wherein the print lens assembly is switchable between an assembly that magnifies an image to one that demagnifies an image onto said photosensitive media.

70. An apparatus for printing an image onto a photosensitive media comprising:

a light source for providing light;

a uniformizing optics assembly for uniformizing said light;

a separator situated relative to said uniformizing optics, wherein said separates said uniformized light into first, second and third light components;

a first polarizing beamsplitter element, wherein said first polarizing beamsplitter element separates said first light component into a first polarization state and a second polarization state;

a first spatial light modulator, wherein said first spatial light modulator is illuminated by said first polarization state first light component in a telecentric manner and said first spatial light modulator creates first modulated light;

a first blur filter, which blurs said first modulated light;

a second polarizing beamsplitter element, wherein said second polarizing beamsplitter element separates said second light component into a first polarization state and a second polarization state;

a second spatial light modulator, wherein said second spatial light modulator is illuminated by said first polarization state second light component in a telecentric manner and said second spatial light modulator creates second modulated light;

a second blur filter which blurs said second modulated light;

a third polarizing beamsplitter element, wherein said third polarizing beamsplitter element is capable of separating said third light component into a first polarization state and a second polarization state;

a third spatial light modulator, wherein said third spatial light modulator is illuminated by said first polarization state third light component in a telecentric manner and said third spatial light modulator creates third modulated light;

a third blur filter which blurs said third modulated light;

a combining prism, wherein said combining prism combines said blurred first, second, and third modulated light;

a print lens, wherein said print lens directs said combined light to a photosensitive media; and wherein said imaging light from said light source is provided for a period of time which matches a media sensitivity of said photosensitive media.

71. An apparatus according to claim 70, wherein said light source is a monochromatic light source.

72. An apparatus according to claim 70, wherein said light source is switchable from providing monochromatic light to providing polychromatic light.

73. An apparatus according to claim 70, wherein said light source is a broadband visible source.

74. An apparatus according to claim 70, wherein said light source is a halogen light source.

75. An apparatus according to claim 70, wherein said light source is a two dimensional array of red, green, and blue LEDs.

76. An apparatus according to claim 70, wherein said light source is at least one laser.

77. An apparatus according to claim 70, wherein said separator of uniformized imaging light into first, second, and third light components is achieved with filters or dichroics.

78. An apparatus according to claim 70, wherein said separator consists of a red dichroic mirror and a blue dichroic mirror oriented in a cross configuration.

79. An apparatus according to claim 70, wherein said combiner prism is a combining prism.

80. An apparatus according to claim 70, wherein said spatial light modulators are comprised of modulator sites which are adapted to rotate a polarization state of incident light and reflect the light through the spatial light modulators and back to the beamsplitting elements.

81. An apparatus according to claim 70, wherein said first, second, and third spatial light modulators are each optimized for a discrete range of visible light wavelengths.

82. An apparatus according to claim 70, wherein said first spatial light modulator is optimized for red light, said second spatial light modulator is optimized for green light, and said third spatial light modulator is optimized for blue light.

83. An apparatus according to claim 70, wherein at least one said spatial light modulator is mounted on a frame which is movable in at least two directions.

84. An apparatus according to claim 70, further comprising:

a polarization element located upstream from said first polarization beamsplitting element;

a polarization element located upstream from said second polarization beamsplitting element; and a polarization element located upstream from said third polarization beamsplitting element.

85. An apparatus according to claim 70, further comprising:

a polarization element located downstream from said first polarization beamsplitting element;

a polarization element located downstream from said second polarization beamsplitting element; and a polarization element located downstream from said third polarization beamsplitting element.

86. An apparatus according to claim 70, wherein the print lens assembly magnifies the complete image onto the photosensitive media.

87. A apparatus according to claim 70, wherein the print lens assembly demagnifies the complete image onto the photosensitive media.

88. An apparatus according to claim 70, wherein the print lens assembley is switchable between an assembly that magnifies an image to one that demagnifies an image onto said photosensitive media.

89. An apparatus for printing an image onto a photosensitive media comprising:

a first light source for providing a first light wavelength;

a uniformizing optics assembly for uniformizing said first light wavelength;

a first polarizing beamsplitter element, wherein said first polarizing beamsplitter element separates said uniformized first light wavelength into a first polarization state and a second polarization state;

a first spatial light modulator, wherein said first spatial light modulator is illuminated by said first polarization state first light wavelength in a telecentric manner and said first spatial light modulator creates a first modulated light;

a first blur filter, capable of blurring said first modulated light;

a second light source for providing a second light wavelength;

a uniformizing optics assembly for uniformizing said second light wavelength;

a second polarizing beamsplitter element, wherein said second polarizing beamsplitter element separates said uniformized second light wavelength into a first polarization state and a second polarization state;

a second spatial light modulator, wherein said second spatial light modulator is illuminated by said first polarization state second light wavelength in a telecentric manner and said second spatial light modulator creates a second modulated light;

a second blur filter, capable of blurring said second modulated light;

a third light source for providing a third light wavelength;

a uniformizing optics assembly for uniformizing said third light wavelength;

a third polarizing beamsplitter element, wherein said third polarizing beamsplitter element is capable of separating said uniformized third light wavelength into a first polarization state and a second polarization state;

a third spatial light modulator, wherein said third spatial light modulator is illuminated by said first polarization state third light wavelength in a telecentric manner and said third spatial light modulator creates a third modulated light;

a third blur filter, capable of blurring said third modulated light;

a combiner prism, wherein said combiner prism is capable of combining said blurred first, second, and third modulated light;

a print lens, wherein said print lens directs said combined light to a photosensitive media; and wherein said imaging light from said light source is provided for a period of time which matches a media sensitivity of said photosensitive media.

90. An apparatus according to claim 89, wherein at of said light sources is a monochromatic light source.

91. An apparatus according to claim 89, wherein at least one light source is switchable from providing monochromatic light to providing polychromatic light.

92. An apparatus according to claim 89, wherein:

said first light source is a broadband visible source with a filter to allow only red light to be emitted;

said second light source is a broadband visible source with a filter to allow only green light to be emitted; and said third light source is a broadband visible source with a filter to allow only blue light to be emitted.

93. An apparatus according to claim 89, wherein:

said first light source is a broadband visible source with a switchable filter to allow red, green or blue light to be emitted;

said second light source is a broadband visible source with a switchable filter to allow red, green or blue light to be emitted; and said third light source is a broadband visible source with a switchable filter to allow red, green or blue light to be emitted.

94. An apparatus according to claim 89, wherein:

said first light source is a halogen light source with a filter to allow only red light to be emitted;

said second light source is a halogen light source with a filter to allow only green light to be emitted; and said third light source is a halogen light source with a filter to allow only blue light to be emitted.

95. An apparatus according to claim 89, wherein:

said first light source is a halogen light source with a switchable filter to allow red, green or blue light to be emitted;

said second light source is a halogen light source with a switchable filter to allow red, green or blue light to be emitted; and said third light source is a halogen light source with a switchable filter to allow red, green or blue light to be emitted.

96. An apparatus according to claim 89, wherein said first, second and third light sources are a two dimensional array of red, green, and blue LEDs.

97. An apparatus according to claim 89, wherein said first light source is an array of red LEDs.

98. An apparatus according to claim 89, wherein said second light source is an array of green LEDs.

99. An apparatus according to claim 89, wherein said third light source is an array of blue LEDs.

100. An apparatus according to claim 89, wherein said first, second and third light sources are at least one laser.

101. An apparatus according to claim 89, wherein said first light source is a laser that emits red light.

102. An apparatus according to claim 89, wherein said second light source is a laser that emits green light.

103. An apparatus according to claim 89, wherein said third light source is a laser that emits blue light.

104. An apparatus according to claim 89, wherein said first, second and third light source are capable of emitting red, green and blue light.

105. An apparatus according to claim 89, wherein said combiner prism is a combining prism.

106. An apparatus according to claim 89, wherein said spatial light modulators are comprised of modulator sites which are adapted to rotate a polarization state of incident light and reflect the light through the spatial light modulators and back to the beamsplitting elements.

107. An apparatus according to claim 89, wherein said first, second, and third spatial light modulators are each optimized for a discrete range of visible light wavelengths.

108. An apparatus according to claim 89, wherein said first spatial light modulator is optimized for red light, said second spatial light modulator is optimized for green light, and said third spatial light modulator is optimized for blue light.

109. An apparatus according to claim 89, wherein at least one said spatial light modulator is mounted on a frame which is movable in at least two directions.

110. An apparatus according to claim 89, further comprising:

a polarization element located upstream from said first polarization beamsplitting element;

a polarization element located upstream from said second polarization beamsplitting element; and a polarization element located upstream from said third polarization beamsplitting element.

111. An apparatus according to claim 89, further comprising:

a polarization element located downstream from said first polarization beamsplitting element;

a polarization element located downstream from said second polarization beamsplitting element; and a polarization element located downstream from said third polarization beamsplitting element.

112. An apparatus according to claim 89, wherein the print lens assembly magnifies the complete image onto the photosensitive media.

113. An apparatus according to claim 89, wherein the print lens assembly demagnifies the complete image onto the photosensitive media.

* * * * *